United States Patent [19]

Wood et al.

[11] Patent Number: 5,985,772
[45] Date of Patent: Nov. 16, 1999

[54] PACKAGING SYSTEM COMPRISING CELLULOSIC WEB WITH A PERMEANT BARRIER OR CONTAMINANT TRAP

[75] Inventors: Willard E. Wood, Arden Hills; Neil J. Beaverson, Hugo, both of Minn.

[73] Assignee: Cellresin Technologies, LLC, Minneapolis, Minn.

[21] Appl. No.: 09/111,263

[22] Filed: Jul. 6, 1998

Related U.S. Application Data

[63] Continuation-in-part of application No. 08/603,337, Feb. 20, 1996, Pat. No. 5,776,842, which is a continuation-in-part of application No. 08/264,771, Jun. 23, 1994, Pat. No. 5,492,947.

[51] Int. Cl.[6] .......................... B32B 27/06; B32B 27/10; B32B 27/32
[52] U.S. Cl. ............................... 442/70; 442/66; 442/67; 442/121; 524/48
[58] Field of Search ................................ 442/66, 67, 70, 442/121

[56] References Cited

U.S. PATENT DOCUMENTS

| 655,661 | 8/1900 | Reenstiema | 280/830 |
|---|---|---|---|
| 2,389,168 | 11/1945 | Snyder | 137/38 |
| 2,412,148 | 12/1946 | Hershberger | 428/230 |
| 2,715,085 | 8/1955 | Boger | 529/430 |
| 2,802,763 | 8/1957 | Freedlander | 156/222 |
| 2,860,801 | 11/1958 | Nielsen | 215/12.2 |
| 2,973,293 | 2/1961 | Schofield | 428/340 |
| 3,129,014 | 4/1964 | Hutchinson et al. | 280/830 |
| 3,472,835 | 10/1969 | Bucker et la. | 536/46 |
| 3,526,572 | 9/1970 | Finelli | 428/412 |
| 3,536,260 | 10/1970 | Volz | 239/6 |
| 3,616,010 | 10/1971 | Dunholter et al. | 156/210 |
| 3,616,189 | 10/1971 | Harr | 428/215 |
| 3,687,087 | 8/1972 | Yurkoski et al. | 105/355 |
| 3,733,309 | 5/1973 | Wyeth et al. | 215/42 |
| 3,740,258 | 6/1973 | Walles | 53/421 |
| 3,802,984 | 4/1974 | Brugh, Jr. et al. | 156/184 |
| 3,886,017 | 5/1975 | Brugh, Jr. et al. | 156/184 |
| 3,904,104 | 9/1975 | Kane | 428/481 |
| 3,958,056 | 5/1976 | Brugh Jr. et al. | 428/215 |
| 3,972,467 | 8/1976 | Whillock et al. | 428/213 |
| 4,048,361 | 9/1977 | Valyi | 215/370 |

(List continued on next page.)

FOREIGN PATENT DOCUMENTS

| 0 454 910 | 11/1991 | European Pat. Off. |
|---|---|---|
| 483380A1 | 5/1992 | European Pat. Off. |
| 0 600 775 | 1/1994 | European Pat. Off. |
| 0 626 256 | 11/1994 | European Pat. Off. |
| 1441752 | 5/1966 | France . |
| 91-6849 | 6/1991 | France . |
| 2677366 | 12/1992 | France . |
| 2927733 | 1/1980 | Germany . |
| 3710569 | 5/1988 | Germany . |
| 195 20 989 | 12/1996 | Germany . |
| 75-64144 | 5/1975 | Japan . |
| 54-142282 | 11/1979 | Japan . |
| 57-205515 | 12/1982 | Japan . |
| 84-156531 | 7/1984 | Japan . |
| 84-260004 | 12/1984 | Japan . |
| 61-103542 | 5/1986 | Japan . |
| 86-106348 | 5/1986 | Japan . |
| 87-27162 | 2/1987 | Japan . |
| 87-98608 | 4/1987 | Japan . |
| 87-269030 | 10/1987 | Japan . |
| 62-263047 | 11/1987 | Japan . |
| 88-87925 | 4/1988 | Japan . |
| 63-218063 | 9/1988 | Japan . |
| 63-237932 | 10/1988 | Japan . |
| 63-265926 | 11/1988 | Japan . |
| 89-16618 | 1/1989 | Japan . |
| 89-167496 | 6/1989 | Japan . |
| 90-18702 | 1/1990 | Japan . |
| 90-18703 | 1/1990 | Japan . |
| 90-18704 | 1/1990 | Japan . |
| 90-18705 | 1/1990 | Japan . |
| 90-18706 | 1/1990 | Japan . |
| 90-254844 | 9/1990 | Japan . |
| 3-100065 | 4/1991 | Japan . |
| 91-133163 | 6/1991 | Japan . |
| 4-108523 | 4/1992 | Japan . |
| 4-132556 | 5/1992 | Japan . |
| 92-362141 | 12/1992 | Japan . |
| 6-181728 | 7/1994 | Japan . |
| 7-35168 | 4/1995 | Japan . |
| 91-JP667 | 5/1991 | WIPO . |
| 91-JP1012 | 7/1991 | WIPO . |
| 95 12484 | 5/1995 | WIPO . |
| WO 96 00260 | 1/1996 | WIPO . |

OTHER PUBLICATIONS

"Basic Concepts of Permeation Processes", *Recent Developments in Separation Science*, pp. 107–155.

"Chapter 1 The Simple Transport Laws", *Diffusion and Sorption Fibers and Films*, pp. 3–11.

"Chapter 14 Convective Diffusion to a Solid Surface", *Diffusion and Sorption in Fibers and Films*, pp. 172–192.

DeLassus, P.T. et al., "Chapter 2 Transport of Apple Aromas in Polymer Films", *American Chemical Society*, pp. 11–27 (1988).

(List continued on next page.)

*Primary Examiner*—Peter A. Szekely
*Attorney, Agent, or Firm*—Merchant & Gould P.C.

[57] ABSTRACT

Nonwoven cellulosic fiber webs including, paperboards and corrugated paper board, etc., are described containing a barrier layer that can act both as a barrier to the passage of a permeant and as a trap for contaminant materials that can arise in new materials or from the recycle of fiber in the manufacture of paperboard. The effective material which acts as a trap or barrier is a cyclodextrin compound, substantially free of an inclusion complex compound. The cyclodextrin barrier layer can be corrugated or sheet laminated with or on the cellulosic web. Alternatively, the cyclodextrin material can be included in a coating composition that is coated on the surface or both surfaces of the cellulosic web after web formation. Further, the cyclodextrin material can be included in a thermoplastic film that can be used as one layer in a bilayer or multilayer laminate containing a cellulosic web.

44 Claims, 2 Drawing Sheets

U.S. PATENT DOCUMENTS

| | | | |
|---|---|---|---|
| 4,108,324 | 8/1978 | Krishnakumar et al. | 215/373 |
| 4,127,633 | 11/1978 | Addleman | 264/510 |
| 4,131,141 | 12/1978 | Weissenbach | 141/285 |
| 4,223,128 | 9/1980 | Halek et al. | 528/481 |
| 4,258,082 | 3/1981 | Horne | 427/160 |
| 4,274,985 | 6/1981 | Szejtli et al. | 525/54.2 |
| 4,303,755 | 12/1981 | Yukuta et al. | 521/52 |
| 4,318,489 | 3/1982 | Snyder et al. | 215/375 |
| 4,334,627 | 6/1982 | Krishnakumar et la. | 215/373 |
| 4,356,115 | 10/1982 | Shibanai et al. | 512/4 |
| 4,357,468 | 11/1982 | Szejtli et al. | 536/56 |
| 4,376,089 | 3/1983 | Bogner et al. | 264/109 |
| 4,473,515 | 9/1984 | Ryder | 264/28 |
| 4,482,586 | 11/1984 | Smith et al. | 428/213 |
| 4,486,378 | 12/1984 | Hirata et al. | 264/512 |
| 4,525,396 | 6/1985 | Takasa et al. | 428/34.2 |
| 4,547,572 | 10/1985 | Fenyvesi et al. | 536/103 |
| 4,568,574 | 2/1986 | Allen | 426/127 |
| 4,598,741 | 7/1986 | Johnson et al. | 141/5 |
| 4,615,914 | 10/1986 | Walles | 427/237 |
| 4,636,343 | 1/1987 | Shibanai | 264/118 |
| 4,677,177 | 6/1987 | Shibanai et al. | 527/300 |
| 4,681,934 | 7/1987 | Shibanai et al. | 536/46 |
| 4,698,246 | 10/1987 | Gibbons et al. | 426/127 |
| 4,711,936 | 12/1987 | Shibanai et al. | 525/485 |
| 4,719,135 | 1/1988 | Gerdes et al. | 428/35.7 |
| 4,722,815 | 2/1988 | Shibanai | 264/117 |
| 4,725,633 | 2/1988 | Shibanai | 523/220 |
| 4,725,657 | 2/1988 | Shibanai | 424/486 |
| 4,726,905 | 2/1988 | Friedman et al. | 210/698 |
| 4,727,064 | 2/1988 | Pitha | 514/58 |
| 4,728,510 | 3/1988 | Shibanai et al. | 424/535 |
| 4,732,759 | 3/1988 | Shibanai et al. | 514/58 |
| 4,738,923 | 4/1988 | Ammeraal | 535/97 |
| 4,769,242 | 9/1988 | Shibanai | 424/411 |
| 4,772,291 | 9/1988 | Shibanai et al. | 8/526 |
| 4,774,329 | 9/1988 | Friedman | 536/103 |
| 4,780,257 | 10/1988 | Beck | 264/532 |
| 4,781,977 | 11/1988 | Yagi et al. | 428/332 |
| 4,795,665 | 1/1989 | Lancaster et al. | 426/106 |
| 4,808,232 | 2/1989 | Beesley | 127/38 |
| 4,840,679 | 6/1989 | Ammeraal et al. | 127/40 |
| 4,847,151 | 7/1989 | Shibanai | 428/389 |
| 4,850,494 | 7/1989 | Howard, Jr. | 215/275 |
| 4,851,394 | 7/1989 | Kubodera | 514/54 |
| 4,871,541 | 10/1989 | Shibanai | 424/911 |
| 4,877,774 | 10/1989 | Pitha et al. | 514/26 |
| 4,877,778 | 10/1989 | Carpenter et al. | 514/58 |
| 4,894,267 | 1/1990 | Bettle et al. | 264/513 |
| 4,902,788 | 2/1990 | Zemel et al. | 428/402 |
| 4,904,306 | 2/1990 | Ammeraal | 127/40 |
| 4,904,307 | 2/1990 | Ammeraal | 127/63 |
| 4,906,488 | 3/1990 | Pera | 426/573 |
| 4,915,301 | 4/1990 | Munteanu | 239/45 |
| 4,917,956 | 4/1990 | Rohrbach | 428/446 |
| 4,920,214 | 4/1990 | Friedman | 536/103 |
| 4,925,684 | 5/1990 | Simon | 426/107 |
| 4,931,524 | 6/1990 | Sato et al. | 527/301 |
| 4,938,998 | 7/1990 | Stock | 427/223 |
| 4,956,210 | 9/1990 | Hoyt et al. | 428/412 |
| 4,965,104 | 10/1990 | Barton et al. | 428/384 |
| 4,977,004 | 12/1990 | Bettle, III et al. | 428/2 |
| 4,977,936 | 12/1990 | Thompson et al. | 141/312 |
| 5,001,176 | 3/1991 | Nakazima | 524/48 |
| 5,006,377 | 4/1991 | Delcorps et al. | 428/192 |
| 5,007,966 | 4/1991 | Hedges et al. | 127/34 |
| 5,007,967 | 4/1991 | Ammeraal | 127/38 |
| 5,032,182 | 7/1991 | Ammeraal et al. | 127/30 |
| 5,041,227 | 8/1991 | van Eikeren et al. | 210/640 |
| 5,063,251 | 11/1991 | Bergishagen | 521/82 |
| 5,079,088 | 1/1992 | McGroarty et al. | 428/331 |
| 5,080,795 | 1/1992 | Pirkle et al. | 210/643 |
| 5,096,893 | 3/1992 | Pitha et al. | 514/58 |
| 5,098,793 | 3/1992 | Rohrback et al. | 428/532 |
| 5,100,878 | 3/1992 | Geber | 514/58 |
| 5,102,699 | 4/1992 | Beeson et al. | 427/379 |
| 5,120,720 | 6/1992 | Pitha et al. | 514/58 |
| 5,122,399 | 6/1992 | Farrell et al. | 222/183 |
| 5,129,544 | 7/1992 | Jacobson et al. | 220/562 |
| 5,139,687 | 8/1992 | Brogher et al. | 510/515 |
| 5,142,035 | 8/1992 | Lewis | 536/103 |
| 5,147,480 | 9/1992 | Lang | 156/64 |
| 5,153,061 | 10/1992 | Cavagna et al. | 428/325 |
| 5,173,481 | 12/1992 | Pitha et al. | 514/58 |
| 5,177,129 | 1/1993 | Bobo, Jr. | 524/48 |
| 5,178,946 | 1/1993 | Sato et al. | 428/412 |
| 5,180,190 | 1/1993 | Kersey et al. | 280/838 |
| 5,183,706 | 2/1993 | Bekele | 428/349 |
| 5,183,809 | 2/1993 | Weisz et al. | 514/58 |
| 5,198,429 | 3/1993 | Konig et al. | 514/58 |
| 5,202,188 | 4/1993 | Bekele | 428/414 |
| 5,208,083 | 5/1993 | Freed | 53/476 |
| 5,208,316 | 5/1993 | Yoshinaga | 528/68 |
| 5,213,808 | 5/1993 | Bar-Shalom et al. | 424/473 |
| 5,221,669 | 6/1993 | Anad et al. | 514/58 |
| 5,223,311 | 6/1993 | Tsutsumi et al. | 427/391 |
| 5,223,346 | 6/1993 | Lu | 428/516 |
| 5,230,935 | 7/1993 | Delimoy et al. | 428/2 |
| 5,232,767 | 8/1993 | Hisazumi et al. | 428/213 |
| 5,241,059 | 8/1993 | Yoshinaga | 127/32 |
| 5,242,701 | 9/1993 | Poole | 426/407 |
| 5,244,615 | 9/1993 | Hobbs | 264/83 |
| 5,246,611 | 9/1993 | Trinh | 510/515 |
| 5,247,013 | 9/1993 | Shinoda et al. | 524/732 |
| 5,252,384 | 10/1993 | Bothe et al. | 428/212 |
| 5,254,258 | 10/1993 | Pirkle et al. | 210/643 |
| 5,254,394 | 10/1993 | Bothe et al. | 428/212 |
| 5,256,491 | 10/1993 | Ishida et al. | 428/500 |
| 5,258,414 | 11/1993 | Bergishagen | 521/82 |
| 5,262,444 | 11/1993 | Rusincovitch et al. | 521/73 |
| 5,266,387 | 11/1993 | Fujii et al. | 428/213 |
| 5,266,413 | 11/1993 | Mills et al. | 428/48 |
| 5,269,935 | 12/1993 | Clough et al. | 210/653 |
| 5,314,733 | 5/1994 | Saito et al. | 220/562 |
| 5,324,383 | 6/1994 | Lang | 156/370 |
| 5,330,565 | 7/1994 | Saitoh et al. | 523/102 |
| 5,330,808 | 7/1994 | Duff et al. | 428/421 |
| 5,335,373 | 8/1994 | Kangman | 2/167 |
| 5,336,762 | 8/1994 | Ranney | 534/16 |
| 5,350,788 | 9/1994 | Visioli et al. | 524/251 |
| 5,352,717 | 10/1994 | Bergishagen | 524/48 |
| 5,354,424 | 10/1994 | Rha et al. | 162/135 |
| 5,378,414 | 1/1995 | Derkach | 264/469 |
| 5,378,421 | 1/1995 | Salame | 264/230 |
| 5,384,172 | 1/1995 | Takado et al. | 428/520 |
| 5,398,729 | 3/1995 | Spurgat | 138/133 |
| 5,405,567 | 4/1995 | Needham et al. | 264/322 |
| 5,505,969 | 4/1996 | Wood et al. | 426/130 |

OTHER PUBLICATIONS

"Integrated Forms of Simple Rate Expressions", pp. 17–19.

"Materials", *Modern Plastics Interntional*, p. 50 (Jul. 1992).

"Nylon Film in Food Packaging", *Paper, Film & Foil Converter*, p. 62.

"Points to Consider for the Use of Recycled Plastics in Food Packaging: Chemistry Consideration", Chemistry Review Branch, U.S. Food & Drug Administration, Washington, D.C., pp. 1–9 (May 1992).

"Trends in Barrier Design", *Packaging*, pp. 30–38 (May 1991).

"Use of CDS in Plastics & Paper", *Cyclodextrin News*, 3(7) (Mar. 1989).

"Determination of Poly(ethylene terephthalate) Oligomers in Refrigeration Oils by Adsorption Column Chromatography—Gel Permeation Chromatography", Kshiono, *Anal. Chem.*, vol. 51, pp. 2398–2400 (Dec. 1979).

"Injection Blow–Molding and Stretch–Blow Modling", *Modern Plastics Encyclopedia*, 61(10a):192–194 (1984).

"Separation and Identification of Poly(ethylene Terephthalate) Oligomers by Gel Permeation Chromatography", *Journal of Polymer Science: Polymer Chemistry Edition*, vol. 17, pp. 4123–4127 (1979).

Barrier Polymers, Kirk–Othmer, Encyclopedia of Chemical Technology, Fourth Edition, vol. 3, pp. 931–962.

Bartle et al., "Supercritical Fluid Extraction and Chromatography for the Determination of Oligomers in Poly(ethylene terephthalate) Films", *Anal. Chem.*, vol. 63, pp. 2371–2377 (1991).

Bataille, P. et al., "Mechanical Properties and Permeability of Polypropylene and Poly(ethylene terphthalate) Mixtures", *Polymer Engineering and Science*, 27(9) (1987).

Begley, T.H. et al., "Recycled Polymers in Food Packaging: Migration Considerations", *Food Technology*, pp. 109–112 (Nov. 1993).

Brandrup, J. et al., *Polymer Handbook*, Interscience Publishers.

Castle, L. et al., "Migration of Plastcizers from Printing Inks into Foods", *Food Additives and Contaminants*, 6(4):437–443 (1989).

Chinodex® Cyclodextrins, Chinoin Pharmaceutical and Chemical Works Ltd., pp. 1–40.

Croft, A. P et al., "Synthesis of Chemically Modified Cyclodextrins", Tetrahedron Report Number 147, Department of Chemistry, Texas Tech University, Lobbock, TX. 79409, USA., pp. 1417–1474 (October 4, 1982).

Culter, J.P. et al., "Minimizing Plastic Package/Product Interactions –An Unfilled Need", *Jounral of Plastic Film & Sheeting*, vol. 8.

Database WPI, Section CH, Week 8842, Derwent Publications Ltd., London, GB; XP002033905 & JP 63 218 063A (Chikayku Shoten KK), Sep. 12, 1988.

Database WPI, Section CH, Week 9123, Derwent Publications Ltd., London, GB; Class A18, AN 91–167598.

Felder, R.M. et al. "Permeation, Diffusion, and Sorption of Gases and Vapors", *Methods of Experimental Physics*, vol. 16c, Copyright 1980 by Academic Press, Inc.

Foster, R.H., "Barrier Packaging Technologies—What are the Alternatives?", Seession 5 Design for Plastics Packaging.

Goldenberg, N. et al., "Off–flavours' in foods, a summary of experience: 1948–74", *Chemistry and Industry* pp. 551–557 (Jul. 5, 1975).

Guise, w., "Packaging for Flavour Retention and Protection from Odours", *Packaging*, pp. 9–13 (Aug. 1992).

Hotchkiss, J.H., "Chapter 1 An Overview of Food and Food Packaging Interactions", American Chemical Society, pp. 1–10 (1988).

Kutner, W. et al., "Preparation and Properties of Insoluble Films of Cyclodextrin Condensation Polymers", *J. Inclusion Phenom. Mol. Recognit. Chem.*, 13(3):257–265.

Landois–Garza, J. et al., "Chapter 4 Permeation of High–Barrier Films by Ethyl Esters", American Chemical Society (1988).

Lox, . et al., "Organoleptic and Migrational Properties of PP Films Produced with Various Amounts of Scrap", *Packaging Technology and Science*, vol. 5, pp. 307–312 (1992).

Maciejewski, M. et al., "Polymer Inclusion Compounds by Polymerization of Monomers in $\mu$–Ccyclodextrin Matrix in DMF Solution", *J. Macromol. Sci.–Chem.*, A13(1):87–109 (1979).

MacLean, D.L. et al., "Fundamentals of Gas Permeation", *Hydrocarbon Processing* (Aug. 1983).

Mannheim, C.H. et al., "Interaction Between Packaging Materials and Foods", *Packaging Technology Science*, vol. 3, pp. 127–132 (1990).

Marsili, R., "Optimizing the Value and Benefits of Packaging Films", *Food Product Design*, pp. 63–75 (Nov. 1993).

Michaels, A.S. et al., "Solubility of Gases in Polyethylene", *Journal of Polymer Science*, vol. L, pp. 393–412 (1961).

Michaels, A.S. et al., "Sorption and Flow of Gases in Polyethylene", *Journal of Polymer Science*, vol. XLI, pp. 53–71 (1959).

Ottino, J.M. et al., "Analysis of Transient Sorption and Permeation of Small Molecules in Multiphase Polymer systems", *Polymer Engineering and Sciences*, 24(2):153–161 (1984).

Patent Abstracts of Japan, vol. 15, No. 493 (M–1191), Dec. 13, 1991 & JP 03 215031 A (Kyoraku Co. Ltd.), Sep. 20, 1991. (See Abstract) & Database WPI Week 9144, Derwent Publications Ltd., London, GB (See Abstract).

Rangarajan, R. et al., "Permeation of Pure Gases under Pressure through Asymmetric Porous Membranes. Membrane Characterization and Prediction of Performance", *Ind. Eng. Chem. Process Des. Dev.*, 23(1):79–87 (1984).

Rellmann, J. et al., "Barrier Media", *Kunstoffe German Plastics*, 82, pp. 3–9 (1992).

Saenger, W., "Cyclodextrin Inclusion Compounds in Research and Industry", *Angew. Chem. Int. Ed. Engl.*, 19, pp. 344–362 (1980).

Shibanai I. et al., "Practical Application of Cyclodextrine to the Production of Insecticide, Mold Control and Fragrant Plastic Films", Japan Liquid Crystal Co., Ltd.

Shibanai, I et al., "Application of cyclodextrin to insecticides, fungicides and aromatic films", *Gosei Jushi*, 34(4):2–9 (Abstract).

Siefke et al., "$\mu$–Ccyclodextrin Matrix Films for Colon–Specific Drug Delivery", *Proceed. Intern. Symp. Control. Rel. Bioact. Mater.*, Controlled Release Society, Inc., 20:182–184 (1993).

Sugawara, H., "Data on Plastic Packaging Materials for Food", (Akita Prefectural Fermentation Research Institute), *Konbatekku*, pp. 1–7 (Translation) (Apr. 1994).

Tamura, M. et al., "The Thin Film of Flouroine–Containing Polymer Having Cyclodextrin Prepared by Langmuir–Blodgett Technique", *Chem. Lett.*, (7):1313–1316 (Abstract).

Thompson, L.J. et al., "Method for Evaluating Package–Related Flavors", *Food Technology*, pp. 90–94 (Jan. 1994).

Tice et al., "Odors and Taints from Paperboard Food Packaging", *Tappi Journal*, 77(12):149–154.

Waniska, R.D. et al., "Surface–Active Properties of $\mu$–Lactoglobulin: Adsorption and Rearrangement of Glycosylated Derivatives in Surface Films", *J. Colloid Interface Sci.*, 117(1):251–257 (Abstract).

Xu, D. et al., "Dispersion of $\mu$–Cyclodextrin Inclusion Compound in Polyethylene and Manufacture of its Blown Films", *Gaofenzi Cailiao Kexue Yu Gongcheng*, 7(6):39–43 (Abstract).

Yamaura, K. et al., "Formation of ultrathin films consisting of proteins or polysaccharides and syndiotactic–rich poly (vinyl alcohol) mixtures adsorbed at air–solution interface", *Colloid Polm. Sci.*, 268(10):968–971 (Abstract).

Yasuda, H. et al., "Permeability Coefficients", pp. 229–240.

Zobel, M.G.R., "The Odour Barrier Performance of Packaging Films", *Packaging*, pp. 22–25 (Dec. 1986).

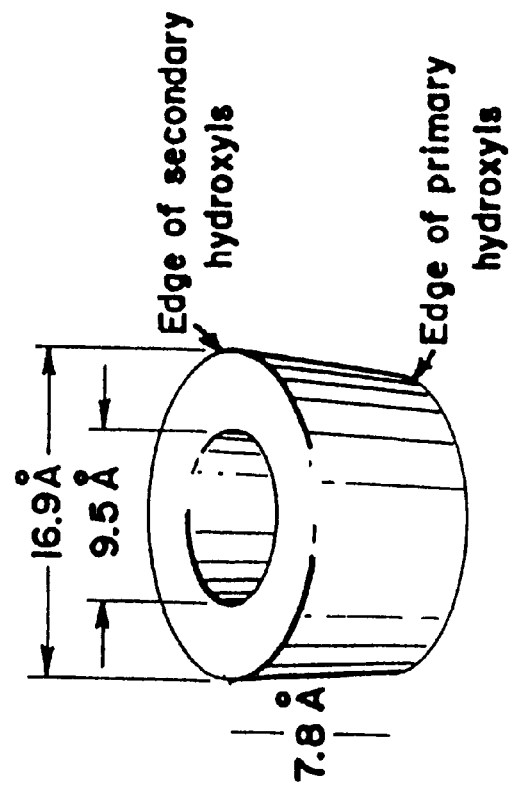
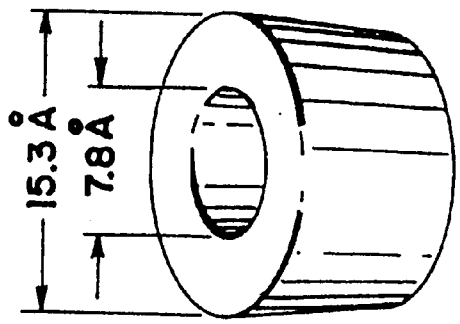
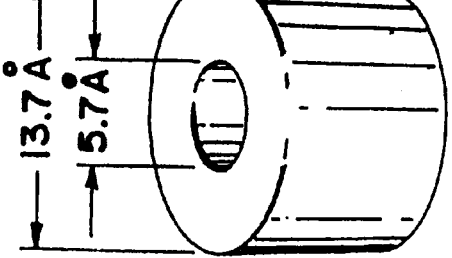
Dimensions of cyclodextrins

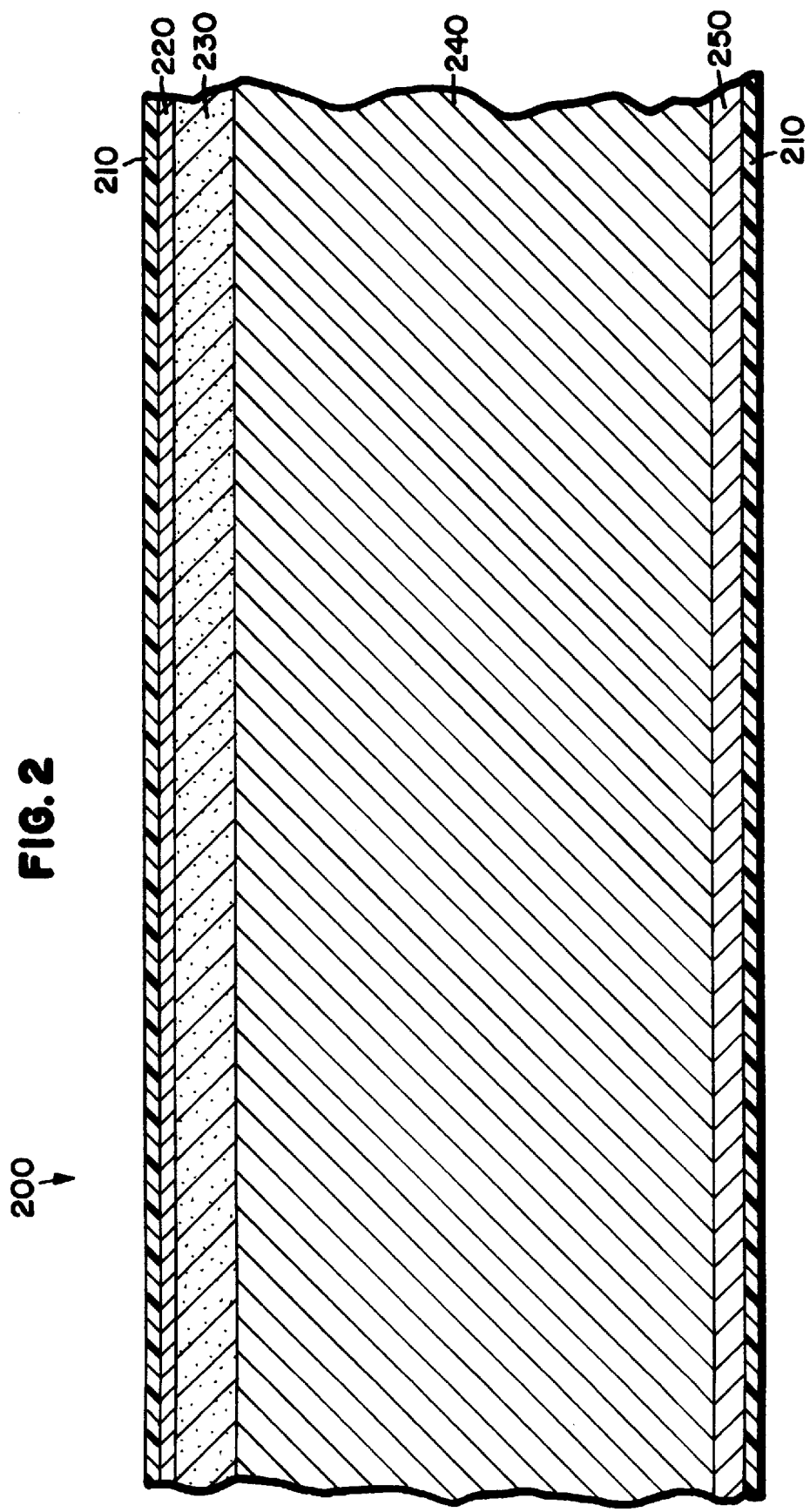

PACKAGING SYSTEM COMPRISING CELLULOSIC WEB WITH A PERMEANT BARRIER OR CONTAMINANT TRAP

CROSS REFERENCE TO RELATED APPLICATIONS

This application is a continuation in part of Wood et al., U.S. Ser. No. 08/603,337 filed on Feb. 20, 1996, now U.S. Pat. No. 5,776,842, issued Jul. 7, 1998, which is a continuation in part of Wood et al., U.S. Ser. No. 08/264,771 filed on Jun. 23, 1994, now U.S. Pat. No. 5,492,947, issued Feb. 20, 1996.

FIELD OF THE INVENTION

The invention relates to improved rigid or semirigid cellulosic packaging material, including chipboard, boxboard, paperboard or cardboard materials, which have permeant barrier or contaminant trapping properties. The preferred barrier paperboard material can reduces the passage of permeant materials from the ambient atmosphere through the paperboard into packaging contents. Further, any mobile or volatile, organic contaminant material from the environment, present within the paperboard or as a paperboard component, derived either from a source of cellulosic material, a printing chemical, a coating chemical or from any contaminant in intentionally recycled material, can be trapped by the active barrier materials within the paperboard packaging structure.

The invention includes a barrier structure comprising at least one layer of a cellulosic material with at least one layer of a barrier or a barrier layer containing an active barrier component. The packaging structure can have other layers useful in packaging systems. The layer of cellulosic material is structural and is manufactured or oriented to have a defined product side and a defined exterior side.

BACKGROUND OF THE INVENTION

Cellulosic materials such as a paperboard, a boxboard, a cardboard or a chipboard consists of relatively thick, compared with paper, sheet materials that are comprised of bonded, small discrete fibers comprising cellulose. Such fibers are typically held together by secondary bonds that, most probably, are hydrogen bonds. To form a cellulosic sheet, fiber is formed into a rough web or sheet on a fine screen from a water suspension or dispersion of fiber and is combined with fiber additives, pigments, binder material, secondary binder materials or other components. After the sheet is formed on a fine screen, the rough sheet is then dried, calendared and further processed to result in a finished sheet having a controlled thickness, improved surface quality, one or more coating layers, a fixed moisture content, etc. Further, after sheet formation the paperboard can be further coated, embossed, printed or further processed before rolling and distribution. Paperboard, boxboard, chipboard or cardboard typically has a caliper (thickness) of greater than about 0.30 mm (in the united kingdom greater than about 0.25 mm). Paper with a basis weight (grammage) generally above 250 g-m$^{-1}$ (51 lbs-10$^3$ft$^{-2}$) is considered paperboard under ISO standards. Typically, paper is considered a sheet-like material having a thickness of less than about 0.25 mm, often less than 0.1 mm.

Paperboard, boxboard, chipboard and cardboard are made in many types and grades to service a variety of uses. The final finishes of paperboard can be rough or smooth, can be laminated with other materials, but are typically thicker, heavier and less flexible than conventional paper materials. Paperboard can be made both from primary sources of fibers and from secondary or recycled fibrous materials. The fiber used in making paperboard largely comes directly from the forestry industry. However, increasingly paperboard is made from recycled or secondary fiber derived from paper, corrugated paperboard, woven and nonwoven fabric, and similar fibrous cellulosic materials. Such recycled fibrous material inherently contains finishing material such as inks, solvents, coatings, adhesives, residue from materials the fiber source contacted and other sources of contamination. These recycled finishing materials in addition to freshly applied finishing materials contain residual volatile organics that can pose some threat of contamination to the stored contents of containers made from such recycled materials.

The main components used in the manufacture of paper products are mechanical/semi-mechanical wood pulp, unbleached Kraft chemical wood pulp, white chemical wood pulp, waste fiber, secondary fiber, non-wood fibers, recycled woven and non-woven fibers, fillers and pigments. Many varieties of wood pulp used are derived from both hard and softwoods. The chemical properties and composition of paperboard are determined by the types of fibers used and by any non-fiber substances incorporated in or applied on the surface of the paper during paper making or subsequent paper converting operations. Paper properties that are affected directly by the fiber's chemical compositions include color, opacity, strength, permanence, and electrical properties.

In the manufacture of paperboard, barrier coatings are often required to improve resistance to the passage of water, water vapor, oxygen, carbon dioxide, hydrogen sulfide, solvents, greases, fats, oils, odors, recycled contaminants or other miscellaneous chemicals through the paperboard material. Water (liquid) barriers are known and can change the wetability of the paper surface using sizing agents. A grease or oil barrier can be provided by hydrating the cellulosic fibers to form a pinhole free sheet or by coating the paper with a continuous film of a material that is fat or grease resistant (lipophobic). Gas or vapor barriers are formed using a continuous film of a suitable material that can act as a barrier to the specific gas or vapor. Paperboard is also often coated or printed to improve lifetime and utility.

A variety of film materials have been developed as barriers to the passage of water vapor, oxygen or other permeants. Brugh Jr. et al., U.S. Pat. No. 3,802,984, teach moisture barriers comprising a laminate of a cellulosic sheet and a thermoplastic material. Dunn Bolter et al., U.S. Pat. No. 3,616,010, teach a moisture barrier comprising a laminated and corrugated paperboard and a lamination layer of a thermoplastic bag stock. Brugh Jr. et al., U.S. Pat. No. 3,886,017, teach a moisture barrier in a container comprising a laminate of high and low density cellulosic sheets within thermoplastic film. Willock et al., U.S. Pat. No. 3,972,467, teach improved paperboard laminates for containers comprising a laminate of paperboard polymer film and an optional aluminum foil layer. Valyi, U.S. Pat. No. 4,048,361, teaches packaging containing a gas barrier comprising a laminate of plastic cellulosic and other similar materials. Gibens et al., U.S. Pat. No. 4,698,246, teach laminates comprising paperboard polyester and other conventional components. Ticassa et al., U.S. Pat. No. 4,525,396, teach a pressure resistant paper vessel comprising a barrier film laminate having gas barrier properties prepared from paperboard thermoplastic films, paper components and other conventional elements. Cyclodextrin materials and substitute cyclodextrin materials are also known.

Further, Pitha et al., U.S. Pat. No. 5,173,481 and "synthesis of chemically modified cyclodextrins," Alan P. Kroft et al., Tetrahedron Reports No. 147; Department of Chemistry, Texas Tech University, Ludwig, Tex., 79409, USA, (Oct. 4, 1982), pp. 1417–1474. Pitha et al. disclose cyclodextrins and substituted cyclodextrins. The major use of cyclodextrin materials is in formation of an inclusion complex for the delivery of an inclusion compound to a use locus. The cyclodextrin material has a hydrophobic interior pore that is ideal for complexing a variety of organic compounds. Unmodified cyclodextrin inclusion complex materials have been used in films, see Japan Patent Application No. 63-237932 and Japanese Patent Application No. 63-218063. The use of cyclodextrin inclusion compounds is discussed in detail in "Cyclodextrin Inclusion Compounds in Research and Industry", Willfrom Saenger, Angew. Chem. Int. Ed. Engl., Vol. 19, pp. 344–362 (1980). The cyclodextrin inclusion compounds are used in a variety of delivery applications. Materials including deodorants, antibacterial materials, antistatic agents, eatable oils, insecticides, fungicides, deliquescent substances, corrosion inhibitors, flavor enhancing compounds, pyrethroids, pharmaceutical and agricultural compounds, etc. can be delivered. Such applications are disclosed in a variety of patents. Exemplary patents include Shibani et al., U.S. Pat. Nos. 4,356,115; 4,636,343; 4,677,177; 4,681,934; 4,711,936; 4,722,815; and others. Yashimaga, JP 4-108523, teaches a permselective membrane used for separation of chiral compounds using a polyvinyl chloride film containing high loadings of a substituted cyclodextrin and a plasticizer. Yoshenaga, JP 3-100065, uses an unsubstituted cyclodextrin in a film layer. Nakazima, U.S. Pat. No. 5,001,176; Bobo Jr. et al., U.S. Pat. No. 5,177,129; and others use cyclodextrin materials to act as an inclusion complex for film stabilizing components. Zejtli et al., U.S. Pat. No. 4,357,468 shows one specific application of the use of cyclodextrin materials as servants in separation techniques. The particular cyclodextrin material is a polyoxyalkylene substituted material used in separation schemes.

Many alleged barrier materials have been suggested in the art but currently there is no suitable material that can act as a barrier for the large variety of potential contaminants that can pass through packaging materials into the contents of the package. Further, the packaging material itself can be a source of permeants. Many paperboard materials, particularly those containing recycled fibers can contain significant levels of volatile contaminants. Certain food products are especially susceptible to absorbing volatile organoleptic chemicals. These foods include milk and other liquids stored within paperboard cartons, breakfast cereals and crackers comprising grain products, and confectionary products containing chocolate. Candies including chocolate and the high fat confectionaries can absorb larger proportions of off flavors. Absorption of these volatiles can mean a shortened shelf-life and reduced sensory quality. The contaminants are derived from chemical components used in paper product manufacture and comprise a component of an ink, an adhesive, a coating, a filler, a sizing, a binder, a polymer, a lubricant, a preservative, a process aid, etc.

Accordingly, a substantial need exists for the development of new paperboard materials or laminates from virgin fiber, recycled fiber or mixtures thereof. The paperboard contains a barrier layer that can act both as a barrier to the passage of contaminants and as a trap for contaminant materials that can arise in new materials or from the recycle of fiber in the manufacture of paperboard.

BRIEF DISCUSSION OF THE INVENTION

We have found that the barrier properties of non-woven cellulosic webs can be substantially improved with a barrier layer comprising cyclodextrin and a diluent. The barrier layer comprising a cyclodextrin and a diluent can be formed using any available layering technology. Examples of useful layer formation processes include lamination, coextrusion, solution coating, suspension coating, spraying, printing, etc. The preferred modes for forming the cyclodextrin/diluent layer on the paperboard comprises a coextrusion or a coating formed from an aqueous solution. Mixtures and coatings are typically manufactured by extruding by a thermoplastic layer comprising a thermoplastic as a diluent with the cyclodextrin dissolved or dispersed within the thermoplastic melt extruded layer. The paperboard is typically coextruded with the layer and is immediately contacted with the extruded thermoplastic and becomes bonded to the thermoplastic cyclodextrin barrier layer. An alternative preferred method of forming the barrier layer is to coat the cellulosic layer with an aqueous or other solvent born solution or dispersion of the cyclodextrin with a diluent. The diluent can comprise a variety of inert carrier or film forming agents. Such materials include starch, modified starch, cellulose, modified cellulose, film forming polymers from natural or synthetic origin, etc. The barrier coating can be formed from a relatively high concentration of diluent and cyclodextrin in preferably an aqueous solution. The concentration of the cyclodextrin in the coating or in the thermoplastic coextruded layer is sufficient to provide a barrier to permeants or to trap paperboard contaminants in the barrier layer. One advantage of the aqueous coating option is the ability to use an unsubstituted cyclodextrin in the barrier layer. Substituted cyclodextrin is typically required for compatibility with melt thermoplastic processing while the unsubstituted cyclodextrin can easily be included in an aqueous coating composition without chemical modification. There appears to be a synergistic effect which results from dispersing the cyclodextrin within starch and the use of such a layer in a two, three or more layer structure. The passage of permeants through or the release of contaminant permeants from a cellulosic web, can be reduced or prevented by forming the cellulosic web with a barrier layer containing an effective permeant or contaminate trapping amount of a cyclodextrin or a substituted or derivatized cyclodextrin compound.

The cellulosic web comprises a structural layer with a defined interior or product side and a defined exterior side. The product side possesses a barrier layer comprising a coating comprising a cyclodextrin or layer comprising a diluent such as starch, cellulose or modified cellulose and a cyclodextrin compound while the exterior side has a layer comprising a clay coating, printing, etc. Optionally, the barrier layer comprises a thermoplastic polymer layer comprising substituted cyclodextrin. Optionally, the web can also contain thermoplastic polymer layers without added cyclodextrins. The finished web typically comprises an exterior finish coating.

Accordingly, the invention can be found in a nonwoven cellulosic fiber web having improved barrier trap properties in the presence of a permeant or contaminant, the web comprising a structural layer comprising a continuous array of randomly oriented cellulosic fiber having a product side and an exterior side; on the product side, a barrier layer comprising a cyclodextrin compound and a diluent; and on the exterior side, a layer comprising a clay; wherein the cyclodextrin compound is subsequently free of an inclusion complex compound and can act as a barrier to the passage of a permeant from the ambient environment or can act as a trap of a contaminant arising from the web.

Further, the invention can also be found in a nonwoven cellulosic fiber web having improved barrier trap properties in the presence of a permeant or contaminant, the web comprising a structural layer comprising a continuous array of randomly oriented cellulosic fiber having a product side and an exterior side; on the product side, a barrier layer comprising a cyclodextrin compound and a starch modified starch, cellulosic a modified cellulosic diluent; on the exterior side, a layer comprising a clay layer and a printed layer; wherein the cyclodextrin compound is subsequently free of an inclusion complex compound and can act as a barrier to the passage of a permeant from the ambient environment or can act as a trap of a contaminant arising from the web.

Further, the invention can also be found in a nonwoven cellulosic fiber web having improved barrier trap properties in the presence of a permeant or contaminant, the web comprising a structural layer comprising a continuous array of randomly oriented cellulosic fiber having a product side and an exterior side; on the product side, a barrier layer comprising a cyclodextrin compound and a coextruded thermoplastic polymer diluent; on the exterior side, a layer comprising a clay layer and a printed layer; wherein the cyclodextrin compound is subsequently free of an inclusion complex compound and can act as a barrier to the passage of a permeant from the ambient environment or can act as a trap of a contaminant arising from the web.

A preferred embodiment of the invention comprises a nonwoven cellulosic fiber web having improved coating barrier trap properties in the presence of a permeant or contaminant, the web comprising a structural layer with a thickness of 0.25 to 1 mm, preferably 0.4 to 0.8 mm, comprising a continuous array of randomly oriented cellulosic fiber having a product side and an exterior side; on the product side, a barrier layer comprising 10 to 60 gm-1000 $ft^{-2}$, comprising 1 to 60 wt. % of a cyclodextrin compound and a coatings diluent; on the exterior side, a layer comprising a clay layer with a thickness of 20 to 80 microns and a printed layer comprising 0.5 to 1 lbs-1000 $ft^{-2}$; wherein the cyclodextrin compound is subsequently free of an inclusion complex compound and can act as a barrier to the passage of a permeant from the ambient environment or can act as a trap of a contaminant arising from the web. The structure can have a finish coating add-on comprising a coating of about 0.05 to 1 lbs-1000 $ft^{-2}$ on either or both sides.

Another preferred embodiment involves a nonwoven cellulosic fiber web having improved extruded film barrier trap properties in the presence of a permeant or contaminant, the web comprising a structural layer with a thickness of 0.25 to 1 mm, preferably 0.4 to 0.8 mm, comprising a continuous array of randomly oriented cellulosic fiber having a product side and an exterior side; on the product side, a barrier layer comprising a an extruded film coating comprising a thickness of 0.3 to 1.5 mil, comprising 0.1 to 60 wt. % of a cyclodextrin compound in a thermoplastic diluent; on the exterior side, a layer comprising a clay layer with a thickness of 20 to 80 microns and a printed layer comprising 0.5 to 1 lbs-1000 $ft^{-2}$ add-on; wherein the cyclodextrin compound is subsequently free of an inclusion complex compound and can act as a barrier to the passage of a permeant from the ambient environment or can act as a trap of a contaminant arising from the web. The structure can have a finish coating add-on comprising a coating of about 0.05 to 1 lbs-1000 $ft^{-2}$ on either or both sides.

The cyclodextrin compound used in this role is a cyclodextrin compound, substantially free of an inclusion complex compound, which can act as a trap or barrier to the passage of a permeant or contaminate through the web or from the web into the container. The improved cellulosic web operates by establishing a sufficient concentration of cyclodextrin compound, free of an inclusion complex compound, in the path of any permeant or contaminate passing through or passing from the cellulosic web. The cyclodextrin compounds that can be used in the invention include unsubstituted cyclodextrins having no intentionally formed substituents on the ring hydroxyls of the cyclodextrin molecule. The cyclodextrin compounds that can be used in the invention also include cyclodextrins that contain substituents on the available primary or secondary hydroxyl groups of the cyclodextrin rings. Such barrier layers can be coated, sprayed, corrugated or sheet laminated with or on the cellulosic web. The cyclodextrin material can be included in a coating composition that is coated on a surface or both surfaces of the cellulosic web after web formation. Such coatings can be formed in a variety of networks including extrusion coatings, Rotogravure coatings, etc. Further, the cyclodextrin material can be included in a thermoplastic film that can be used as one layer in a bilayer or multilayer laminate containing a cellulosic web. Such a laminate can contain additional layers of cellulosic materials or other types of barrier layers. The laminate can contain additional layers of a film material that can contain the cyclodextrin barrier or trap material or can optionally contain other ingredients. The cyclodextrin can be part of the film by extrusion or by coating a flexible cyclodextrin layer in the film.

For the purpose of this application, the term "web" refers to any non-woven sheet-like assembly of randomly oriented cellulosic fiber. Such webs are typically continuous webs and contain no substantial apertures. Such webs can take the form of thin paper sheets, heavy paper, cardboard, paperboard, card stock or chipboard stock or laminates made from paper, paperboard, thermoplastic webs or coated sheets thereof.

For the purpose of this application and claims the term "permeant" refers to a chemical compound or composition that, at ambient temperatures and pressures, can be transported through at least a portion of the cellulosic web. Such permeants can arise in the ambient atmosphere or environment, can be absorbed on one surface of the web and be transported through the cellulosic web interior to be released from the opposite web surface. Additionally, such permeants can arise as contaminants in the web or from ingredients used in manufacturing, and can be transported from the interior of the web to a surface of the web for release either into the ambient atmosphere or into any internal enclosed space surrounded by the web. As used in this application, the term "trap" refers to a cyclodextrin or cyclodextrin derivative that can act to complex and immobilize, within the web, any impurity in the web arising from impurities present during the paper making process. The impurities are included in the cyclodextrin molecule, totally or in part, without covalent bonding in the central pore of the molecular structure. Such impurities can arise from contamination of the source of cellulosic fiber, for example, recycle of used cellulosic materials or by contamination arising from any other source. The term "barrier" means the prevention of transport of a permeant from one surface of a cellulosic web through the interior of the web for release from the opposite surface of the web. A "packaging system" comprises a two, three, or more layer structure having at least a cellulosic web. The layers comprise a barrier layer or trap used with either a printing layer, a clay layer, a film laminate, or any other useful layer in common packaging.

BRIEF DISCUSSION OF THE DRAWING

FIG. 1 is a graphical representation of the dimension of the cyclodextrin molecule without derivatization. An α-, β- and γ-cyclodextrin is shown.

FIG. 2 is a cross-sectional view of a cellulosic web typical of the invention.

DETAILED DISCUSSION OF THE INVENTION

Cellulosic Web

Paper or paperboard has a thin layered network of randomly oriented fibers bonded together through hydrogen bonding. Paper or paperboard products are made from bondable fibrous material and form a layered structure of fiber in random orientation. Cellulosic fibers are the prime material for papermaking, however, any paper or paperboard material can contain other fibers in combination with cellulosic materials. Paper and paperboard are made from aqueous suspensions of fibers. Cellulosic fibers are readily dispersed or suspended in water that serves as a carrier before the suspension is applied to a screen in the papermaking process. The primary source of fibrous materials used in paperboard manufacturing include wood pulp, waste paper such as newspaper, corrugated paperboard, deinked fiber, cotton, lint or pulp, and other materials. Waste or recycled paper also known as secondary fiber is becoming more and more important in paper and paperboard manufacture. The percentage of paperboard recycle as secondary fiber has substantially increased since 1980 becoming a major source of fiber. Cellulosic pulp typically made from hard and soft wood but can be made from any planned source of cellulosic material include ground wood pulp, pressurized ground wood pulp, ground wood pulp from chips, refinery mechanical pulp, chemi-refiner mechanical pulp, chemi thermomechanical pulp, thermochemical pulp, sodium sulfite treated TMP pulp, sulfonated chip and mechanical pulp, tandem thermomechanical pulp. In any of these processes, water elevated temperature chemical additives and other materials are added to chip wood to reduce the wood to a useful pulp material. In the recycle or pulping of secondary fibers, the used fiber is typically introduced into an aqueous bath containing a variety of chemicals that separate the cellulosic components of the paper into fiber and remove ink coatings and other materials in the recycled paper.

Paper or paperboard is made, from virgin or recycled fiber or both, in a typical fourdrinier paper process using a fourdrinier paper machine. The fourdrinier paper machine typically comprises a head box for the clean pulp, a screen section for initial web formation rollers and presses in connection with the fourdrinier screen that removes additional water from the rough web. Presses that regulate thickness and surface quality and finally a take-up reel or storage portion. In the fourdrinier process, a stock aqueous pulp enters the head box and delivers a ribbon of aqueous stock to the fourdrinier water at a uniform dilution thickness and add-on speed. The head box contains a slice, a narrow opening in the head box through which the stock flows in a controlled thickness onto a wire mesh. The wire is a continuous belt of woven material originally metal wire but now most frequently a plastic web. The wire travels over a series of rollers that both keep the wire level and remove water from the rough cellulosic web. Water is removed from the pulp first by gravity, then by low pressure and finally by suction devices located under the wire. The paper web leaves the wire at this point. The wire in a continuous loop returns to the head box for additional stock. The rough cellulosic web, when in the press section comprising hard rolls that squeeze the paper gently to remove water, is compressed to promote bonding and to form a rough thickness. The cellulosic web then passes through and around a series of steam filled drums called dryer cans that remove residual water by evaporation. In the dryer section, chemicals can be added in a size press to the surface of the web. At the finishing end of the machine are calendar reel and rewinder rolls that act to press the sheet, to smooth the sheet, and to control final thickness. After finishing, the web is wound on a reel for further transport to use or further treatment.

The dried paper webs can be modified to improve properties. Both internal and external sizings can be used to prove water resistance. Wet strength agents and bonding additives can be used in forming the cellulosic web to aid in retaining wet strength. The web can be physically modified using a calendaring process. Machine calendar is a stack of steel rolls at the dry end of a paper making machine that compresses the web forming a flatter, smoother surface. This flat surface accepts print, feeds more smoothly in use in machines and can also adjust thickness. The surface of the web can also be pigmented with a pigmented coating or layer. Pigmented coatings and layers typically comprise a pigment and a binder material. Typical pigments include a clay, calcium carbonate, titanium dioxide or plastic pigments. A preferred pigment material is clay. The pigments are typically applied in the form of an aqueous suspension or dispersion of pigment material in the binder or adhesive composition. Typically binders or adhesives include starch, proteins, styrene butadiene dispersions or lattices, polyvinyl acetate and lattices, acrylic lattices and others. Coatings are applied with conventional application equipment that ensure the coating is applied uniformly to the entire surface, the amount of coating obtains the appropriate or desired thickness or coat weight on the entire web and results in a smooth surface finish. The exterior surface of the web can include a printed layer.

The cellulosic webs of the invention include newsprint on coated ground wood paper, coated papers, uncoated free sheets, writing paper, envelope stock, kraft stock, bristol board, tabulated card stock, unbleached packaging, wrapping shipping sack stock, bag and sack stock, packaging unbleached craft wrapping stock, wrapping stock, shipping stock, waxing stock, solid wood pulp paperboard, unbleached craft paperboard, unbleached liner board, carton-type board stock, milk carton board stock, heavy weight cup stock, bleached paperboard stock, recycled paperboard, construction paper and board, structural insulating board and others. If paperboard is used in the invention, it is preferred that it be a paperboard with thickness of about 0.25 to 1 mm, preferably, a caliper of about 15 to 30 (about 0.4 mm to 0.8 mm; 0.15 inches to 0.30 inches), preferably, 16 to 28 point (0.16 inches to 0.28 inches).

The paperboard of the invention can also include corrugated paperboard materials. Corrugated paperboard is typically made by first manufacturing a single faced structure comprising a fluted medium adherently attached to a top liner making a single faced board (one flat layer bonded to a corrugated sheet). In manufacturing the single faced material, the web is first corrugated and then combined with the liner board using commonly available starch-based corrugating adhesives. Once combined in the single facer, the corrugated material and the liner are permitted to bond and dry. After the single facer is complete, it is then bonded to a second liner using a similar corrugating adhesive material. To make double wall board or further layers of corrugated paperboard, similar process steps are repeated until a sufficient number of layers is complete for the desired application.

The paperboard and corrugated paperboard materials of the invention can be used to manufacture various types of packages. Folded packages including corrugated container boxes, folding carton can be made from corrugated medium solid bleached or unbleached paperboard. Flexible containers can be made as bags, sacks, pouches, wrappers and labeled items made from paper laminates comprising a web film or foil clay coated paper laminates, thermoplastic material coated paper laminates or multilayer paper laminates.

Cyclodextrin

The cellulosic webs of the invention contain a cyclodextrin or a substituted or derivatized cyclodextrin in a barrier or trap layer. The barrier or trap layer comprises cyclodextrin in a layer with a diluent, in a coating or in a film laminate. The cyclodextrin material is compatible with the diluent, coating or thermoplastic polymer. For this invention, compatible means that the cyclodextrin material can be uniformly dispersed into the layer, can retain the ability to trap or complex permeant materials or polymer impurity, and can reside in the layer without substantial reductions in the important packaging characteristics of the web. Compatibility can be determined by measuring web characteristics such as tensile strength, tear resistance, permeability or transmission rates for permeants, surface smoothness, etc.

Cyclodextrin is a cyclic oligosaccharide consisting of at least five, preferably at least six glucopyranose units joined by α-1,4 linkages. Although cyclodextrin with up to twelve glucose residues are known, the three most common homologies (α cyclodextrin, β cyclodextrin and γ cyclodextrin) having six, seven and eight residues have been used. Cyclodextrin is produced by a highly selective enzymatic synthesis. They consist of six, seven, or eight glucose monomers arranged in a torus or donut shaped ring, which are denoted α, β, or γ cyclodextrin respectively (See FIG. 1). The specific coupling of the glucose monomers gives the cyclodextrin a rigid, truncated conical molecular structure with a hollow interior of a specific volume. This internal cavity, which is lipophilic (i.e., is attractive to hydrocarbon materials in aqueous systems and is hydrophobic) when compared to the exterior, is a key structural feature of the cyclodextrin, providing the ability to the hydrocarbon portion of complex molecules (e.g., aromatics, alcohols, alkyl halides and aliphatic halides, carboxylic acids and their esters, etc.). The complexed molecule must satisfy the size criterion of fitting at least partially into the cyclodextrin internal cavity, resulting in an inclusion complex.

CYCLODEXTRIN TYPICAL PROPERTIES

| PROPERTIES | α-CD | β-CD | γ-CD |
|---|---|---|---|
| Degree of Polymerization (n = ) | 6 | 7 | 8 |
| Molecular Size (A°) | | | |
| inside diameter | 5.7 | 7.8 | 9.5 |
| outside diameter | 13.7 | 15.3 | 16.9 |
| height | 7.0 | 7.0 | 7.0 |
| Specific Rotation $[a]^{25}_D$ | +150.5 | +162.5 | +177.4 |
| Color of iodine complex | Blue | Yellow | Yellowish Brown |
| Solubility in water (g/100 ml) 25° C. Distilled Water | 14.50 | 1.85 | 23.20 |

The oligosaccharide ring forms a torus, that can be visualized as a truncated cone, with primary hydroxyl groups of each glucose residue lying on a narrow end of the torus. The secondary glucopyranose hydroxyl groups are located on the wide end.

The parent cyclodextrin molecule, and useful derivatives, can be represented by the following formula (the ring carbons show conventional numbering) in which the vacant bonds represent the balance of the cyclic molecule:

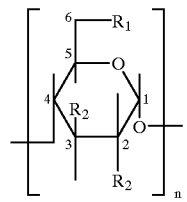

$R_1$ = Primary Hydroxyl
$R_2$ = Secondary Hydroxyls wherein $R_1$ and $R_2$ are primary or secondary hydroxyl as shown.

Cyclodextrin molecules possess several sites available for reaction with a chemical reagent. These sites include the primary hydroxyl at the six position of the glucose moiety and the secondary hydroxyls in the two and three positions. Because of the geometry of the cyclodextrin molecule, and the chemistry of the ring substituents, all hydroxyl groups are not equal in reactivity. However, with care and effective reaction conditions, the cyclodextrin molecule can be reacted to obtain a derivatized molecule having all hydroxyl groups derivatized with a single substituent type. Such a derivative is a persubstituted cyclodextrin. Cyclodextrin with selected substituents (i.e.) substituted only on the primary hydroxyl or selectively substituted only at one or both the secondary hydroxyl groups can also be synthesized if desired. Further directed synthesis of a derivatized molecule with two different substituents or three different substituents is also possible. These substituents can be placed at random or directed to a specific hydroxyl. For the purposes of this invention, the cyclodextrin molecule needs to contain sufficient compatible substituent groups on the molecule to insure that the cyclodextrin material can be uniformly dispersed into the cellulosic material. Both substituted an non-substituted cyclodextrin and mixtures thereof can be used as a barrier or trap component. The contaminant or permeant becomes held within the central pore or cavity of the molecule.

Apart from the introduction of substituent groups on the cyclodextrin hydroxyls, other molecule modifications can also be used. Other carbohydrate molecules can be incorporated into the cyclic backbone of the cyclodextrin molecule. The primary hydroxyl can be replaced using $SN_2$ displacement, oxidized dialdehyde or acid groups can be formed for further reaction with derivatizing groups, etc. The secondary hydroxyls can be reacted and removed leaving an unsaturated group to which can be added a variety of known reagents that can add or cross a double bond to form a derivatized molecule. Further, one or more ring oxygen of the glycan moiety can be opened to produce a reactive site. These techniques and others can be used to introduce compatibilizing substituent groups on the cyclodextrin molecule.

The preferred preparatory scheme for producing a derivatized cyclodextrin material, having a functional group compatible with the coatings, diluents, thermoplastic polymer, involves reactions at the primary or secondary hydroxyls of the cyclodextrin molecule. Broadly we have found that a broad range of pendant substituent moieties can be used on the molecule. These derivatized cyclodextrin molecules can include acylated cyclodextrin, alkylated cyclodextrin, cyclodextrin esters such as tosylates, mesylate and other related sulfo derivatives, hydrocarbyl-amino cyclodextrin, alkyl phosphono and alkyl phosphato cyclodextrin, imidazolyl substituted cyclodextrin, pyridine substituted cyclodextrin, hydrocarbyl sulfur containing functional group cyclodextrin, silicon-containing functional group substituted cyclodextrin, carbonate and carbonate substituted cyclodextrin, carboxylic acid and related substituted cyclodextrin and others. The substituent moiety must include a region that provides compatibility to the derivatized material.

Acyl groups that can be used as compatibilizing functional groups include acetyl, propionyl, butyryl, trifluoroacetyl, benzoyl, acryloyl and other well known groups. The formation of such groups on either the primary or secondary ring hydroxyls of the cyclodextrin molecule involve well known reactions. The acylation reaction can be conducted using the appropriate acid anhydride, acid chloride, and well known synthetic protocols. Peracylated cyclodextrin can be made. Further, cyclodextrin having less than all of available hydroxyls substituted with such groups can be made with one or more of the balance of the available hydroxyls substituted with other functional groups.

Cyclodextrin materials can also be reacted with alkylating agents to produced an alkylated cyclodextrin. Alkylating groups can be used to produce peralkylated cyclodextrin using sufficient reaction conditions exhaustively react available hydroxyl groups with the alkylating agent. Further, depending on the alkylating agent, the cyclodextrin molecule used in the reaction conditions, cyclodextrin substituted at less than all of the available hydroxyls can be produced. Typical examples of alkyl groups useful in forming the alkylated cyclodextrin include methyl, propyl, benzyl, isopropyl, tertiary butyl, allyl, trityl, alkyl-benzyl and other common alkyl groups. Such alkyl groups can be made using conventional preparatory methods, such as reacting the hydroxyl group under appropriate conditions with an alkyl halide, or with an alkylating alkyl sulfate reactant.

Tosyl(4-methylbenzene sulfonyl) mesyl (methane sulfonyl) or other related alkyl or aryl sulfonyl forming reagents can be used in manufacturing compatibilized cyclodextrin molecules for use in thermoplastic resins. The primary —OH groups of the cyclodextrin molecules are more readily reacted than the secondary groups. However, the molecule can be substituted on virtually any position to form useful compositions.

Such sulfonyl containing functional groups can be used to derivatize either of the secondary hydroxyl groups or the primary hydroxyl group of any of the glucose moieties in the cyclodextrin molecule. The reactions can be conducted using a sulfonyl chloride reactant that can effectively react with either primary or secondary hydroxyl. The sulfonyl chloride is used at appropriate mole ratios depending on the number of target hydroxyl groups in the molecule requiring substitution. Both symmetrical (per substituted compounds with a single sulfonyl moiety) or unsymmetrical (the primary and secondary hydroxyls substituted with a mixture of groups including sulfonyl derivatives) can be prepared using known reaction conditions. Sulfonyl groups can be combined with acyl or alkyl groups generically as selected by the experimenter. Lastly, monosubstituted cyclodextrin can be made wherein a single glucose moiety in the ring contains between one and three sulfonyl substituents. The balance of the cyclodextrin molecule remaining unreacted.

Amino and other azido derivatives of cyclodextrin having pendent thermoplastic polymer containing moieties can be used in the sheet, film or container of the invention. The sulfonyl derivatized cyclodextrin molecule can be used to generate the amino derivative from the sulfonyl group substituted cyclodextrin molecule via nucleophilic displacement of the sulfonate group by an azide ($N_3^{-1}$) ion. The azido derivatives are subsequently converted into substituted amino compounds by reduction. Large numbers of these azido or amino cyclodextrin derivatives have been manufactured. Such derivatives can be manufactured in symmetrical substituted amine groups (those derivatives with two or more amino or azido groups symmetrically disposed on the cyclodextrin skeleton or as a symmetrically substituted amine or azide derivatized cyclodextrin molecule. Due to the nucleophilic displacement reaction that produces the nitrogen containing groups, the primary hydroxyl group at the 6-carbon atom is the most likely site for introduction of a nitrogen containing group. Examples of nitrogen containing groups that can be useful in the invention include acetylamino groups (-NHAc), alkylamino including methylamino, ethylamino, butylamino, isobutylamino, isopropylamino, hexylamino, and other alkylamino substituents. The amino or alkylamino substituents can further be reactive with other compounds that react with the nitrogen atom to further derivatize the amine group. Other possible nitrogen containing substituents include dialkylamino such as dimethylamino, diethylamino, piperidino, piperizino, quaternary substituted alkyl or aryl ammonium chloride substituents, halogen derivatives of cyclodextrins can be manufactured as a feed stock for the manufacture of a cyclodextrin molecule substituted with a compatibilizing derivative. In such compounds the primary or secondary hydroxyl groups are substituted with a halogen group such as fluoro, chloro, bromo, iodo or other substituents. The most likely position for halogen substitution is the primary hydroxyl at the 6-position.

Hydrocarbyl substituted phosphono or hydrocarbyl substituted phosphato groups can be used to introduce compatible derivatives onto the cyclodextrin. At the primary hydroxyl, the cyclodextrin molecule can be substituted with alkyl phosphato, aryl phosphato groups. The 2, and 3, secondary hydroxyls can be branched using an alkyl phosphato group.

The cyclodextrin molecule can be substituted with heterocyclic nuclei including pendent imidazole groups, histidine, imidazole groups, pyridino and substituted pyridino groups.

Cyclodextrin derivatives can be modified with sulfur containing functional groups to introduce compatibilizing substituents onto the cyclodextrin. Apart from the sulfonyl acylating groups found above, sulfur containing groups manufactured based on sulfhydryl chemistry can be used to derivatize cyclodextrin. Such sulfur containing groups include methylthio (—SMe), propylthio (—SPr), t-butylthio (—S—C(CH$_3$)$_3$), hydroxyethylthio (—S—CH$_2$CH$_2$OH), imidazolylmethylthio, phenylthio, substituted phenylthio, aminoalkylthio and others. Based on the ether or thioether chemistry set forth above, cyclodextrin having substituents ending with a hydroxyl aldehyde ketone or carboxylic acid functionality can be prepared. Such groups include hydroxyethyl, 3-hydroxypropyl, methyloxylethyl and corresponding oxime isomers, formyl methyl and its oxime isomers, carbylmethoxy (—O—CH$_2$—CO$_2$H), carbylmethoxymethyl ester (—O—CH$_2$CO$_2$—CH$_3$). Cyclodextrin with derivatives formed using silicone chemistry can contain compatibilizing functional groups.

Cyclodextrin derivatives with functional groups containing silicone can be prepared. Silicone groups generally refer to groups with a single substituted silicon atom or a repeating silicone-oxygen backbone with substituent groups. Typically, a significantly proportion of silicone atoms in the silicone substituent bear hydrocarbyl (alkyl or aryl) substituents. Silicone substituted materials generally have increased thermal and oxidative stability and chemical inertness. Further, the silicone groups increase resistance to weathering, add dielectric strength and improve surface tension. The molecular structure of the silicone group can be varied because the silicone group can have a single silicon atom or two to twenty silicon atoms in the silicone moiety, can be linear or branched, have a large number of repeating silicone-oxygen groups and can be further substituted with a variety of functional groups. For the purposes of this invention the simple silicone containing substituent moieties are preferred including trimethylsilyl, mixed methyl-phenyl silyl groups, etc.

In summary, a large number of possible cyclodextrin substituents are feasible, depending on the specific material the cyclodextrin is to be dispersed within. However, there are particular substituents which are preferred, especially when they are to be dispersed within a starch layer. Preferred substituted cyclodextrins include those that are acylated or possess trimethyl silyl, hydroxy ethyl or hydroxy propyl substituents.

Barrier Layers

FIG. 2 shows a cross section 200 of a preferred composite material typical of the invention. This consists of a paperboard layer 240 combined with several layers. Starting at the top of the figure is the outer layer 210, which consists of an aqueous borne acrylic coating or UV coating that contains one or more cyclodextrin species. Under this top layer is a printed layer 220 comprising ink, which provides the text and graphics used to identify and decorate the carton or other paperboard packaging material. The ink layer 220 is deposited on a clay coat 230 which may optionally include one or more cyclodextrin species. On the interior (product side) of the paperboard material is a diluent layer 250 which contains one or more cyclodextrin species. The figure only shows one preferred embodiment and is not construed to limit the invention in any way. For example, the packaging material could also include one or more polymeric layers not shown. A second diluent and cyclodextrin layer could be included immediately exterior the paperboard layer 240 to act as a barrier to permeants entering from the environment. The invention is largely directed to the use of barrier layers which comprise cyclodextrin material combined with a diluent in a coating, layer or laminate. The barrier layer of the invention can be formed in a variety of ways. The barrier layer must comprise a diluent composition in which the cyclodextrin is dispersed, dissolved or suspended in an active barrier mode. The barrier layer can be formed by coating, coextrusion, lamination, spraying, printing, etc. Preferred barrier layers are formed by coating from an aqueous solution comprising a diluent and a cyclodextrin. An optional preferred barrier layer is formed by coextruding a thermoplastic layer comprising a substituted cyclodextrin with the paperboard in a coextrusion process to form the barrier layer intimately bonded to the cellulosic material.

Barrier Layer Comprising a Cyclodextrin and a Diluent

The cyclodextrin materials can be incorporated into a barrier cellulosic web by forming the cellulosic web or a similar structure containing a cellulosic layer with a layer containing an effective amount of a cyclodextrin or substituted cyclodextrin combined with a solid diluent.

In forming the barrier layers of the invention, coatings can be formed either on a film which is later laminated on a film which is later laminated onto the cellulosic web or can be coated to form a film on the cellulosic web. Such coating processes involve the application of liquid to a traveling cellulosic web. Such coating processes commonly use machines having an application section and a metering section. Careful control of the amount and thickness of the coating obtains optimized barrier layers without waste of material. A number of coating machines are known such as tension sensitive coaters, for example, coaters using a metering rod, tension insensitive coating stations that can maintain coat weight even as web tensions vary, brush coating methods, air knife coaters, etc. Such coating machines can be used to coat one or both sides of a flexible film or one or both sides of a cellulosic web.

Coating machines described above commonly apply a liquid composition containing a film forming material, additives that can help form and maintain the coating composition along with the effective amount of the cyclodextrin or substituted cyclodextrin material. The film forming materials are often called a binder. Such binders exist in the final coating as a polymer of high molecular weight. The polymeric layers of the invention may also be coextruded together.

Preferably, the barrier layer comprises, in different diluents:

| Coating Type | gCD/1000 $FT^2$ | Range (wt %-of coating) |
|---|---|---|
| Starch Coatings | 10–50 | 0.5–5 |
| Cellulose Coatings | 10–50 | 0.5–5 |
| Acrylic Coatings | 0.05–1.5[1] | 0.05–0.5 |
| Extrusion Coatings | 0.2–20 | 0.1–3 |

[1]0.0005 to 0.006 g-CD/$m^2$

Optionally, the barrier layer can include compounds which fluoresce when radiated, particularly when the radiation source comprises X-rays. Such compounds are known in the art and include such chemicals as NaCl, NaBr, $Na_2SO_4$, KCl, KBr, $K_2SO_4$, $FeCl_2$, $FeBr_2$, $FeSO_4$, and mixtures thereof.

Polymeric Barrier Layers

Layers of thermoplastic polymers can be used on either the product or exterior side of the cellulosic web. These layers can be used without cyclodextrins to help seal the cellulosic web against liquids. They can also be used as diluents with cyclodextrins to help form barriers against permeant diffusion or migration of volatile thermoplastic polymer contaminants, thermal-decomposition products and oligomers. A polymeric film on either side of the web can also contain cyclodextrin.

Because there are many thermoplastic polymers available, it is prudent to select a particular polymer according to the particular attributes and properties desired. Important properties include tensile strength, elongation, stiffness, tear strength and resistance; optical properties including haze, transparency; chemical resistance such as water absorption and transmission of a variety of permeant materials including water vapor and other permeants; electrical properties such as dielectric constant; and permanence properties including shrinkage, cracking, weatherability, etc.

Thermoplastic materials can be formed into barrier film using a variety of processes including paperboard web extrusion coatings, blown thermoplastic extrusion, linear biaxially oriented film extrusion and by casting from molten thermoplastic resin, monomer or polymer (aqueous or organic solvent) dispersion. These methods are well known manufacturing procedures. The characteristics in the polymer thermoplastics that lead to successful barrier film formation are as follows. Skilled artisans manufacturing thermoplastic polymers have learned to tailor the polymer material for thermoplastic processing and particular end use application by controlling molecular weight (the melt index has been selected by the thermoplastic industry as a measure of molecular weight—melt index is inversely proportional to molecular weight, density and crystallinity).

For thermoplastic extrusion coating polyolefins (polyalpha olefins such as (LDPE) low density polyethylene, (LLDPE) linear low density polyethylene, (HDPE) high density polyethylene) are the most frequently used thermoplastic polymers, although polypropylene, ethylene-vinylacetate (EVA), polyethyleneterephthalate (PET or PETG) and polybutylene-terephthalate (PBT) are sometimes used to make extrusion coatings. Polyolefins typically have a melt index from 0.3 to 20 grams/10 mins., a density of about 0.910 to about 0.970 grams/cc, and a weight average molecular weight ($M_w$) that can range from about 200,000 to 500,000. Coextrusion, in which back-to-back layers of two plastic layers are coated onto paperboard, makes it possible to adhere nylon, or other similarly situated polymers, that by itself will not adhere to paperboard. Extrusion coatings are typically 0.30 mil (0.0003 inches). For roll coating of aqueous based acrylic, urethane and PVDC, etc. dispersions are polymerized to an optimum crystallinity and molecular weight before coating.

A variety of thermoplastic materials are used in making film and sheet products. Such materials include poly (acrylonitrile-co-butadiene-co-styrene) polymers, acrylic polymers such as the polymethylmethacrylate, poly-n-butyl acrylate, poly(ethylene-co-acrylic acid), poly(ethylene-co-methacrylate), etc.; cellophane, cellulosics including cellulose acetate, cellulose acetate propionate, cellulose acetate butyrate and cellulose triacetate, etc.; fluoropolymers including polytetrafluoroethylene (TEFLON®), poly (ethylene-co-tetrafluoroethylene) copolymers, (tetrafluoroethylene-co- propylene) copolymers, polyvinyl fluoride polymers, etc., polyamides such as nylon 6, nylon 6,6, etc.; polycarbonates; polyesters such as poly(ethylene-co-terephthalate), poly(ethylene-co-1,4-naphthalene decarboxylate), poly(butylene-co-terephthalate); polyamide materials; polyethylene materials including low density polyethylene; linear low density polyethylene, high density polyethylene, high molecular weight high density polyethylene, etc.; polypropylene, biaxially oriented polypropylene; polystyrene, biaxially oriented polystyrene; vinyl films including polyvinyl chloride, (vinyl chloride-co-vinyl acetate) copolymers, polyvinylidene chloride, polyvinyl alcohol, (vinyl chloride-co-vinylidene dichloride) copolymers, specialty films including polysulfone, polyphenylene sulfide, polyphenylene oxide, liquid crystal polyesters, polyether ketones, polyvinylbutyral, etc.

While a large number of thermoplastic polymers exist and possible serve some utility in the claimed invention, particular polymers are preferred. Preferred polymers include polyethylene, polypropylene, polyester, copolymers comprising vinyl acetate, copolymers comprising vinyl chloride, copolymers comprising an acrylic monomer, polymers comprising styrene or mixtures thereof.

The thermoplastic film materials can be laminated to a cellulosic web using commonly available typically heat driven laminating techniques. In such techniques, the film can be joined to the cellulosic web substrate using two common methods. The film can be extruded directly onto the cellulosic web and bonded to the web with conventional thermal techniques. In extrusion coating processes, plastic pellets containing the cyclodextrin derivative are melted at high temperatures (commonly greater than about 350° C.). The molten plastic is extruded through a narrow slit or die. At the same instant this molten material comes into contact with a cellulosic web. It is immediately pressed with a very smooth and relatively cool chill roll (30–40° C.). Such an operation imparts a smooth impervious surface of the plastic as well as forming a strong laminating bond to the cellulosic web. Appearance and nature of the coating is typically a function of the type of chill roll used and is not a characteristic of the plastic material.

Additionally, the film can be taken from a roll of film and laminated to the cellulosic web using heat techniques or through the use of a bonding layer which is commonly heat activated. A pre-extruded or precast film can be brought into contact with the cellulosic web, heated to a temperature greater than its melt point and then is immediately pressed with a smooth cool chill roll. Such laminating processes are typically completed using well known processes described above. Such a lamination can be improved using an adhesive material that can aid in forming a bonded film web laminate. Such materials are commonly coated on the film, on the cellulosic web prior to heat treatment.

The cyclodextrin materials can be incorporated into a barrier cellulosic web by coating the cellulosic web or a similar structure containing a cellulosic layer with a liquid coating composition containing an effective amount of a cyclodextrin or substituted cyclodextrin. Such coating compositions are typically formed using an aqueous medium. Aqueous media are typically formed by combining water with additives and components that can form a useful coatable aqueous dispersion.

In forming the barrier layers of the invention, coatings can be formed either on a film which is later laminated on a film which is later laminated onto the cellulosic web or can be coated to form a film on the cellulosic web. Such coating processes involve the application of liquid to a traveling cellulosic web. Such coating processes commonly use machines having an application section and a metering section. Careful control of the amount and thickness of the coating obtains optimized barrier layers without waste of material. A number of coating machines are known such as tension sensitive coaters, for example, coaters using a metering rod, tension insensitive coating stations that can maintain coat weight even as web tensions vary, brush coating methods, air knife coaters, etc. Such coating machines can be used to coat one or both sides of a flexible film or one or both sides of a cellulosic web.

Coating machines described above commonly apply a liquid composition containing a film forming material, additives that can help form and maintain the coating composition along with the effective amount of the cyclodextrin or substituted cyclodextrin material. The film forming materials are often called a binder. Such binders exist in the final coating as a polymer of high molecular weight. Thermoplastic polymers or crosslinking polymers can both be used. Such binders are grouped into certain overlapping classes including acrylic, vinyl, alkyl, polyester, etc. Further, the compositions described above are materials that can be used in forming the polymer films also have corresponding materials that can be used in the formation of aqueous and solvent based coating compositions. Such coating compositions can be made by combining the liquid medium with solid materials containing the polymer, the cyclodextrin and a variety of useful additives. Preferably, the barrier layer includes sufficient cyclodextrin to yield a measurement of cyclodextrin per 1000 ft$^2$ of about 0.2 to 20 g/1000 ft$^2$ or 0.002 to 0.22 g/m$^2$. Optionally, the polymeric barrier layer can include compounds which fluoresce when radiated, particularly when the radiation source comprises X-rays. Such compounds are known in the art and include such chemicals as NaCl, NaBr, Na$_2$SO$_4$, KCl, KBr, K$_2$SO$_4$, FeCl$_2$, FeBr$_2$, FeSO$_4$, and mixtures thereof.

Starch and Water Soluble Cellulosic Barrier Layer

The cyclodextrin materials can be incorporated into a barrier cellulosic web by coating the cellulosic web or a similar structure containing a cellulosic layer with a liquid coating composition containing an effective amount of a cyclodextrin or substituted cyclodextrin combined with a starch or water soluble cellulosic diluent. Such coating compositions are typically formed using a liquid medium that can act as a carrier for the starch and cyclodextrin. Liquid mediums can include an aqueous medium or organic solvent media. Aqueous media are typically formed by combining water with additives and components that can form a useful coatable aqueous dispersion combined with the starch and cyclodextrin. Preferably, a barrier layer formed on a web includes sufficient cyclodextrin to yield a measurement of from about 10 to 50 grams cyclodextrin per 1000 ft$^2$ (about 0.1 to 0.6 g-m$^{-2}$). Optionally, the starch or cellulosic barrier layer can include compounds which fluoresce when radiated, particularly when the radiation source comprises X-rays. Such compounds are known in the art and include such chemicals as NaCl, NaBr, Na$_2$SO$_4$, KCl, KBr, K$_2$SO$_4$, FeCl$_2$, FeBr$_2$, FeSO$_4$, and mixtures thereof.

Packages and Packed Items

The cellulosic web containing the cyclodextrin or compatible derivatized cyclodextrin can be used in a variety of packaging formats to package a variety of items. General packaging ideas can be used. For example, the items can be packaged entirely in a pouch, bag, etc. Further, the web can be used as a paper closure over a rigid plastic container. Such containers can have a rectangular, circular, square or other shaped cross-section, a flat bottom and an open top. Both the container and a paper or web closure can be made of the coated, thermoplastic coated or laminated materials of the invention. Further, the coated, thermoplastic coated or laminated materials of the invention can be used in the formation of the cellulosic portion, blister pack packaging, clam shell type enclosures, tub, tray, etc. Products that can be packaged in the methods of the invention include coffee, ready to eat cereal, crackers, pasta, cookies, frozen pizza, candy, cocoa or other chocolate products, dry mix gravies and soups, snack foods (chips, crackers, popcorn, etc.), baked foods, pastries, breads etc., dry pet food (cat food, etc.), butter or butter-flavor notes, meat products, in particular butter or butter-flavor notes used in the manufacture of microwave popcorn in microwaveable paper containers, fruits and nuts, etc.

The above explanation of the nature of the cyclodextrin, the cyclodextrin derivatives, thermoplastic films, coatings or manufacturing detail regarding the production of film coatings and webs, and the processes of cyclodextrin to make compatible derivatives provides a basis for understanding technology involving incorporating compatible cyclodextrin in a cellulosic web or paperboard structure for barrier purposes. The following examples provide a further basis for understanding the invention and includes the best mode.

Thermoplastic Polymer Testing

The polymer films tested were made according to procedures discussed in U.S. Pat. No. 5,603,974, issued Feb. 18, 1997 to Wood et al., which is expressly incorporated by reference herein. The test procedures used are also described in the same reference.

Initially, we produced four experimental test films as a model for barrier layers. Three of the films contained β-cyclodextrin βCD at loading of 1%, 3% and 5% (wt./wt.) while the fourth was a control film made from the same batch of resin and additives but without βCD. The 5% loaded βCD film was tested for complexation of residual organic in the test film. The βCD was found to effectively complex residual organics in the linear low density polyethylene (LLDPE).

We have evaluated nine modified βcyclodextrins and a milled β-cyclodextrin (particle size 5 to 20 microns). The different cyclodextrin modifications were acetylated, an octanyl succinate derivative, an ethoxyhexyl glycidyl ether derivative, a quaternary amine derivative, a tertiary amine derivative, a carboxymethyl derivative, a succinylated, an amphoteric and trimethylsilyl ether derivative. Each experimental cyclodextrin (1% loading wt/wt) was mixed with low density polyethylene (LLDPE) using a Littleford mixer and then extruded using a twin screw Brabender extruder.

The nine modified cyclodextrin and milled cyclodextrin LLDPE profiles were examined under an optical microscope at 50× and 200× magnification. The microscopic examination was used to visually check for compatibility between LLDPE resin and cyclodextrin. Of the ten cyclodextrin candidates tested, three (acetylated, octanyl succinate and trimethylsilyl ether) were found visually to be compatible with the LLDPE resin.

Complexed residual film volatiles were measured using cryotrapping procedure to test 5% βCD film sample and three extruded profiles containing 1% (wt/wt) acetylated βCD octanyl succinate βCD and trimethylsilyl ether. The method consists of three separate steps; the first two are carried out simultaneously while the third, an instrumental technique for separating and detecting volatile organic compounds, is conducted after one and two. In the first step, an inert pure, dry gas is used to strip volatiles from the sample. During the gas stripping step, the sample is heated at 120° C. The sample is spiked with a surrogate (benzene-d$_6$) immediately prior to the analysis. Benzene-d$_6$ serves as an internal QC surrogate to correct each set of test data for recovery. The second step concentrates the volatiles removed from the sample by freezing the compounds from the stripping gas in a headspace vial immersed in a liquid nitrogen trap. At the end of the gas-stripping step, an internal standard (toluene-d$_8$) is injected directly into the headspace vial and the vial is capped immediately. Method and system blanks are interspersed with samples and treated in the same manner as samples to monitor contamination. The concentrated organic components are then separated, identified and quantitated by heated headspace high resolution gas chromatography/mass spectrometry (HRGC/MS). The results of the residual volatile analyses are presented in the table below:

TABLE 1

| Sample Identification | PERCENT VOLATILE COMPLEXATION as Compared to Control |
|---|---|
| 5% βCD Blown Film | 80 |
| 1% Acylated βCD Profile | 47 |
| 1% Octanyl Succinate βCD Profile | 0 |
| 1% Trimethylsilyl ether Profile | 48 |
| 1% βCD Milled Profile | 29 |

In these preliminary screening tests, βCD derivatives were shown to effectively complex trace volatile organics inherent in low density polyethylene resin used to make experimental film. In 5% βCD loaded LLDPE film, approximately 80% of the organic volatiles were complexed. However, all βCD films (1% and 5%) had an off-color (light brown) and off-odor. The color and odor problem is believed to be the result of direct decomposition of the CD or impurity in the CD. Two odor-active compounds (2-furaldehyde and 2-furanmethanol) were identified in the blown film samples.

Of the three modified compatible CD candidates (acetylated, octanyl succinate and trimethylsilyl ether), the acetylated and trimethylsilyl ether CD were shown to effectively complex trace volatile organics inherent in the LLDPE resin. One percent loadings of acetylated and trimethylsilyl ether (TMSE) βCD showed approximately 50% of the residual LPDE organic volatiles were complexed, while the octanyl succinate CD did not complex residual LLDPE resin volatiles. Milled βCD was found to be less effective (28%) than the acetylated and TMSE modified βCD's.

The 1% TMSE βCD film was slightly better than the 1% acetylated βCD film (24% -vs- 26%) for removing aromatic permeants at 72° F. adding more modified CD appeared to have no improvement.

For aromatic permeants at 105° F., both 1% TMSE βCD and 1% acetylated βCD are approximately 13% more effective removing aromatic permeants than 72EF. The 1% TMSE film was again slightly better than the 1% film (36% -vs- 31%) for removing aromatic permeants.

The 1% TMSE film was more effective initially removing aliphatic permeants than the 1% acetylated βCD film at 72° F. But for the duration of the test, 1% TMSE βCD was worse than the control while 1% acetylated βCD removed only 6% of the aliphatic permeants.

We produced two experimental aqueous coating solutions. One solution contained hydroxyethyl βCD (35% by weight) and the other solution contained hydroxypropyl βCD (35 by weight). Both solutions contained 10% of an acrylic emulsion comprising a dispersion of polyacrylic acid having a molecular weight of about 150,000 (Polysciences, Inc.) (15% solids by weight) as a film forming adhesive. These solutions were used to hand-coat test film samples by laminating two LLDPE films together. Two different coating techniques were used. The first technique very slightly stretched two film samples flat, the coating was then applied using a hand roller, and then the films were laminated together while stretched flat. The Rev. 1 samples were not stretched during the lamination process. All coated samples were finally placed in a vacuum laminating press to remove air bubbles between the film sheets. Film coating thicknesses were approximately 0.0005 inches. These CD coated films and hydroxylmethyl cellulose coated control films were subsequently tested.

A reduction in aromatic and aliphatic vapors by the hydroxyethyl βCD coating is greater in the first several hours of exposure to the vapor and then diminishes over the next 20 hours of testing. Higher removal of aliphatic vapors than aromatic vapors was achieved by the hydroxyethyl βCD coating; this is believed to be a function of the difference in their molecular size (i.e., aliphatic compounds are smaller than aromatic compounds). Aliphatic permeants were reduced by 46% as compared to the control over the 20 hour test period. Reduction of aromatic vapors was 29% as compared to the control over the 17 hour test period.

The Rev. 1 coated hydroxyethyl βCD reduced the aliphatic permeants by 87% as compared to the control over the 20 hour test period. It is not known if the method of coating the film was responsible for the additional 41% reduction over the other hydroxyethyl βCD coated film. The hydroxyethyl βCD coating was slightly better for removing aromatic permeants than the hydroxypropyl βCD coating (29% -vs- 20%) at 72° F.

Preparation of Cyclodextrin Derivatives

EXAMPLE I

An acetylated β-cyclodextrin was obtained that contained 3.4 acetyl groups per cyclodextrin on the primary hydroxyl (—OH) group.

EXAMPLE II

A β-cyclodextrin was obtained which contained approximately 1.7 trimethylsilylether substituent per β-cyclodextrin molecule. The substitution appeared to be commonly on a primary 6-carbon atom.

Table 2 gives the identity of each test roll:

TABLE 2

Extruded Films Made with Low Density Polyethylene

| Roll # | Sample ID |
|---|---|
| 1 | control |
| 2 | 1% Ex. I |
| 3 | 1% Ex. I |
| 4 | 1% Ex. I |
| 5 | 1% Ex. I |
| 6 | 1% Ex. I |
| 7 | 0.5% Ex. I |
| 8 | 2% Ex. I |
| 9 | 1% Ex. II |
| 10 | 1% Ex. II |
| 11 | 1% Ex. II |
| 12 | 1% Ex. II |
| 13 | 0.5% Ex. II |
| 14 | 0.5% Ex. II |
| 15 | 2% Ex. II |
| 16 | 2% Ex. II |
| 17 | 2% Ex. II |

The results of the testing show that the inclusion of a compatible cyclodextrin material in the thermoplastic films of the invention substantially improves the barrier properties by reducing transmission rate of a variety of fuel vapor permeants. The data showing the improvement in transmission rate is shown below in the following data tables.

Comparison of Transmission Rates in Modified β-Cyclodextrin - LDPE Films
Temperature 72° F.
Sample Side: Room % RH
Environment: Room % RH

| Sample Identification | Aromatic Transmission Rate* | Aromatics % Improvement Over Control | Total Volatiles Transmission Rate* | Tot. Volatiles % Improvement Over Control |
|---|---|---|---|---|
| Control Film 1.0% CS-001 | 3.35E−04 | 0% | 3.79E−04 | 0% |
| (Roll #2) 1.0% CS-001 | 3.18E−04 | 5% | 3.61E−04 | 5% |
| (Roll #3) 1.0% CS-001 | 2.01E−04 | 40% | 2.55E−04 | 33% |
| (Roll #5) 1.0% CS-001 | 2.67E−04 | 20% | 3.31E−04 | 13% |
| (Roll #6) | 3.51E−04 | −5% | 3.82E−04 | −1% |

Comparison of Transmission Rates in Modified β-Cyclodextrin - LDPE Films
Temperature 72° F.
Sample Side: Room % RH
Environment: Room % RH

| Sample Identification | Aromatic Transmission Rate* | Naphtha % Improvement Over Control |
|---|---|---|
| Control Film (Roll #1) | 7.81E−03 | 0% |
| 0.5% CS-001 (Roll #7) | 7.67E−03 | 2% |
| 1% CS-001 (Roll #5) | 7.37E−03 | 6% |
| 2% CS-001 (Roll #8) | 6.53E−03 | 16% |

*gm @ 0.001 in.
100in$^2$@24hrs.

Comparison of Transmission Rates in Modified β-Cyclodextrin - LDPE Films
Temperature 72° F.
Sample Side: Room % RH
Environment: Room % RH

| Sample Identification | Aromatic Transmission Rate* | Aromatics % Improvement Over Control | Total Volatiles Transmission Rate | Tot. Volatiles % Improvement Over Control |
|---|---|---|---|---|
| Control Film (Roll #1) | 5.16E−04 | 0% | 5.63E−04 | 0% |
| 1.0% CS-001 (Roll #5) | 4.01E−04 | 22% | 5.17E−04 | 8% |
| 2.0% CS-001 (Roll #8) | 2.91E−04 | 44% | 3.08E−04 | 45% |

Comparison of Transmission Rates in Modified β-Cyclodextrin - LDPE Films
Temperature 72° F.
Sample Side: Room % RH
Environment: Room % RH

| Sample Identification | Aromatic Transmission Rate* | Naphtha % Improvement Over Control |
|---|---|---|
| Control Film (Roll #1) | 7.81E−03 | 0% |
| 0.5% CS-001 (Roll #7) | 7.67E−03 | 2% |
| 1% CS-001 (Roll #5) | 7.37E−03 | 6% |
| 2% CS-001 (Roll #8) | 6.53E−03 | 16% |

*gm @ 0.001 in.
100in$^2$@24hrs.

Comparison of Transmission Rates in Modified β-Cyclodextrin - LLDPE Films
Temperature 72° F.
Sample Side: 0.25 Aw
Environment: 60% RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Film (Roll #1) | 3.76E−04 | 0% | 3.75E−04 | 0% |
| 0.5% CS-001 (Roll #7) | 2.42E−04 | 36% | 2.41E−04 | 36% |
| 1% CS-001 (Roll #5) | 3.39E−04 | 10% | 3.38E−04 | 10% |
| 2% CS-001 (Roll #8) | 2.48E−04 | 34% | 2.47E−04 | 34% |

Comparison of Transmission Rates in Modified β-Cyclodextrin - LDPE Films
Temperature 105° F.
Sample Side: Room % RH
Environment: Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Film (Roll #1) | 1.03E–03 | 0% | 1.13E–03 | 0% |
| 1% CS-001 (Roll #2) | 5.49E–04 | 47% | 5.79E–04 | 49% |
| 1% CS-001 (Roll #3) | 4.74E–04 | 54% | 5.00E–04 | 56% |
| 1% CS-001 (Roll #4) | 6.41E–04 | 38% | 6.83E–04 | 40% |
| 1% CS-001 (Roll #5) | 5.22E–04 | 49% | 5.54E–04 | 51% |
| 1% CS-001 (Roll #6) | 4.13E–04 | 60% | 4.39E–04 | 61% |
| 2% CS-001 (Roll #8) | 5.95E–04 | 42% | 6.18E–04 | 45% |
| 1% TMSE (Roll #12) | 8.32E–04 | 19% | 8.93E–04 | 21% |

*gm @ 0.001 in.
100in²@24hrs.

Comparison of Transmission Rates in Modified β-Cyclodextrin - LDPE Films
Temperature 105° F.
Sample Side: Room % RH
Environment: Room % RH

| Sample Identification | Aromatic Transmission Rate* | Aromatics % Improvement Over Control | total Volatiles Transmission Rate* | T. Volatiles % Improvement Over Control |
|---|---|---|---|---|
| Control Film (Roll #1) | 4.34E–04 | 0% | 4.67E–04 | 0% |
| 0.5% CS-001 (Roll #7) | 4.03E–04 | 7% | 4.41E–04 | 6% |
| 1.0% CS-001 (Roll #5) | 5.00E–04 | –15% | 5.33E–04 | –14% |
| 2.0% CS-001 (Roll #8) | 3.96E–04 | 9% | 3.94E–04 | 16% |

Comparison of Transmission Rates in Modified β-Cyclodextrin - LDPE Films
Temperature 72° F.
Sample Side: Room % RH
Environment: Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Film | 3.09E–04 | 0% | 3.45E–04 | 0% |
| 0.5% TMSE (Roll #13) | 2.50E–04 | 19% | 2.96E–04 | 14% |
| 0.5% TMSE (Roll #14) | 2.37E–04 | 23% | 2.67E–04 | 33% |
| 1% TMSE (Roll #9) | 2.67E–04 | 14% | 3.05E–04 | 12% |
| 1% TMSE (Roll #10) | 4.85E–04 | –57% | 5.27E–04 | –53% |
| 1% TMSE (Roll #11) | 2.58E–04 | 17% | 2.92E–04 | 15% |
| 1% TMSE (Roll #12) | 2.15E–04 | 31% | 2.55E–04 | 26% |
| 2% TMSE (Roll #15) | 2.54E–04 | 18% | 3.04E–04 | 12% |
| 2% TMSE (Roll #16) | 2.79E–04 | 10% | 3.21E–04 | 7% |
| 2% TMSE (Roll #17) | 2.81E–04 | 9% | 3.24E–04 | 6% |

*gm @ 0.001 in.
100in²@24hrs.

Comparison of Transmission Rates in Modified β-Cyclodextrin - LDPE Films
Temperature 72° F.
Sample Side: Room % RH
Environment: Room % RH

| Sample Identification | Aromatic Transmission Rate* | Naphtha % Improvement Over Control |
|---|---|---|
| Control Film (Roll #1) | 9.43E–03 | 0% |
| 1% TMSE (Roll #12) | 1.16E–02 | –23% |
| 2% TMSE (Roll #15) | 1.56E–02 | –65% |

Comparison of Transmission Rates in Modified β-Cyclodextrin - LDPE Films
Temperature 72° F.
Sample Side: Room % RH
Environment: Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Film (Roll #1) | 8.36E–04 | 0% | 9.05E–04 | 0% |

-continued

| | | | | |
|---|---|---|---|---|
| 0.5% TMSE (Roll #14) | 6.77E–04 | 19% | 7.25E–04 | 20% |
| 2% TMSE (Roll #15) | 6.36E–04 | 24% | 6.81E–04 | 25% |

*gm @ 0.001 in.
100in²@24hrs.

Comparison of Transmission Rates in Modified β-Cyclodextrin - LDPE Films
Temperature 72° F.
Sample Side: 0.25 Aw
Environment: 60% RH

| Sample Identification | Aromatic Transmission Rate* | Aromatics % Improvement Over Control | Total Volatiles Transmission Rate* | T. Volatiles % Improvement Over Control |
|---|---|---|---|---|
| Pvdc Control | 6.81E–05 | 0% | 1.05E–04 | 0% |
| PVdC w/10% HP B-CyD | 1.45E–05 | 79% | 2.39E–05 | 77% |
| PVdC w/20% HP B-CyD | 9.71E–05 | –42% | 1.12E–04 | –7% |

Comparison of Transmission Rates in Modified β-Cyclodextrin - LDPE Films
Temperature 72° F.
Sample Side: Room % RH
Environment: Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Acrylic | 2.07E–06 | 0% | 2.10E–05 | 0% |
| 5% HP B-CyD/Acrylic | 1.50E–06 | 27% | 2.07E–05 | 1% |
| 10% HP B-CyD/Acrylic | 4.13E–06 | –100% | 4.30E–05 | –105% |

*gm @ 0.001 in.
100in²@24hrs.

Modified Cellulose Polymeric Testing
Substrate

A finished paperboard carton combines binders, inks, overprint varnishes and plastics as part of a multi-layer structure. The carton finishing materials are sources of odorous volatile substances that can adversely affect flavor/aroma qualities of packaged food products. Odorous substances are typically substances containing functional groups such as aldehydes, esters, acetates and also those with unsaturated groups.

Paperboard Sample Preparation

Comparative laboratory analytical and sensory testing was conducted on printed recycled paperboard carton samples overcoated with water-based acrylic and cellulose coatings. Table 3 summarizes the carton coatings. Sample variables include: overprint acrylic coating, with and without cyclodextrin treatment, and cellulose coating with and without cyclodextrin.

cyclodextrin (50% alpha and 50% gamma cyclodextrin) the cellulose acting as a diluent. The 0.5% cellulose solution was prepared by diluting 1.8 g of hydroxypropyl methyl cellulose (Hercules MP-943W) with 358 g of deionized water to produce 360 g of a 0.5% cellulose solution. The cyclodextrin containing cellulose solution was prepared diluting 1.8 g of hydroxypropyl methyl cellulose with 2.7 g of alpha cyclodextrin (Wacker Biochem Corporation) and 2.7 g of gamma cyclodextrin (Wacker Biochem Corporation) with 352 g of deionized water to produce 360 g of a 0.5% cellulose solution.

Acrylic Coating Solution

Two acrylic solutions were prepared. A control solution of a waterbased acrylic overprint coating (Coatings and Adhesives Corporation, 1245C) used "as received." The second 1245C acrylic coating solution contained 0.13% cyclodextrin (70% alpha and 30% gamma cyclodextrin). The latter

TABLE 3

Carton Coating Variables

| | | Test Variables | | Coating Weight[a] | | Cyclodextrin Coating Weight[a] | |
|---|---|---|---|---|---|---|---|
| Sample Description | Sample Identification | Overprint Acrylic Coating | Cellulose Coating | Acrylic Coating g/M² | Cellulose Coating g/M² | Acrylic mg/M² | Cellulose mg/M² |
| Printed Paperboard | Control | No Cyclodextrin | No Cyclodextrin | 7.3 | 0.043 | NA | NA |
| Printed Paperboard | Test | Cyclodextrin[b] | Cyclodextrin | 7.3 | 0.300 | 25 | 215 |

[a]. Dry Weight Basis.
[b]. Blend containing 70% alpha and 30% gamma cyclodextrin.
[c]. Blend containing 50% alpha and 50% gamma cyclodextrin Cellulose Coating Solution Two cellulosic coating solutions were prepared: a 0.5% cellulose solution and a 0.5% cellulose solution with 1.5% was prepared by mixing 0.326 g of alpha cyclodextrin and 0.140 g of gamma cyclodextrin with 359.5 g of 1245C coating.

Coating Process

All paperboard coatings were performed on a clean, smooth glass plate 12 inches wide and 24 inches long. A 12-inch #2.5 drawdown bar with a 0.25-inch diameter from Industry Tech of Oldsmar, Florida, was used to apply the acrylic and cellulose coatings. For each board, an excess of the cellulose or acrylic coating solution was applied to a 16"×4"×0.04" sheet of clean, rigid PVC at one end of the paperboard in a pool 11 to 12 inches long.

The cellulose coating solution was drawn across the backside (unprinted side) of the paperboard at a constant speed, using the drawdown rod at the rate of 1.1 to 1.4 seconds to complete each board. Coated boards were allowed to dry at ambient conditions for two hours.

Following the cellulose coating, the paperboard carton samples were coated with a water-based acrylic coating. The acrylic coatings were applied to the printed cartonboard surface in an identical fashion as the cellulose coating. Coated boards were allowed to dry at ambient conditions for one hour and then the control and test samples were separately wrapped in aluminum foil until the samples were compared analytically or by sensory analysis.

Sensory Test Procedures

Overview: The inherent odor-producing volatiles from a finished paperboard are emitted into the jar's headspace during confinement, and the odor intensity is rated by a panel of judges. Panelists smell the headspace of each jar and rate the intensity of cartonboard off-odors using a category scale with 0=no off-odors to 8=very strong off-odors.

Materials: 16 oz Mason jars with lids, glass vials 12 mm×75 mm containing 3 ml DI water, 4"×4" pieces of foil, controlled environment maintained at 100° F. (38° C.) and 4"×10" paperboard samples.

Procedure: A sample (4"×10") was cut from each carton. Control and test carton samples were cut from the same carton location. Each sample was carefully rolled on its narrow side while inserting small glass capillary tubes to separate the concentric coils. The cartonboard sample was placed into a 16-oz. Mason jar, and then the vial of water was added. A 4"×4" piece of aluminum foil was used to cover the mouth of the jar, and then the lid was screwed onto the jar over the foil. Twenty jars of test samples and twenty corresponding control samples were prepared for the odor panel. The sample jars were placed into a controlled environment maintained at 100° F. (38° C.) for 25 hours. Following 25 hours at 100° F. temperature, the samples were removed from the controlled environment and held at ambient for 16 hours before sensory evaluation. Each jar was identified with a three-digit code label. Equal numbers of control and test cartonboard combinations of AB and BA were presented to the panel. Each panel judge was presented two coded samples. The panelist opens the left jar and smells the headspace; then the right jar and smells the headspace. Judges rate cartonboard off-odors using the following category scale:

0=no off-odor
1=just detectable
2=very slight
3=slight
4=slight-moderate
5=moderate
6=moderate-strong
7=strong
8=very strong off-odor.

Results: ANOVA was used to determine whether there was a statistical difference between the off-odor intensity scores of the control and test samples. The least significant difference test (LSD) was used to compare odor intensity mean scores of the control and test. The mean scores were significantly different from each other ($\alpha=0.05$). Odor intensity test results are provided below in Table 4.

TABLE 4

| Jar Odor Sensory Results Jar Odor Sensory Test | |
|---|---|
| Sample Identification | Mean Score |
| Control | 5.5[a] |
| Test | 4.8[b] | ab = significantly different at $\alpha = 0.05$

Dynamic Headspace High Resolution Gas Chromatography/Mass Spectrometry

Overview: The inherent volatile compounds emitted from the cartonboard samples into the jar's headspace during confinement were qualitatively and quantitatively determined by dynamic headspace trapping of the cartonboard volatiles and subsequent high resolution gas chromatography/mass spectrometry (GC/MS) analysis.

Materials: 250 ml I-Chem bottle with TEFLON® lined lids, glass vials 12 mm×75 mm containing 3 ml DI water, controlled environment maintained at 100° F. (38° C.), and two 3 ½"10" paperboard samples.

Procedure: Two 3 ½"×10" cartonboard strips were cut from the carton. Control and test carton samples were cut from the same carton location. The paperboard sample was rolled on its narrow side while inserting small glass capillary tubes to separate the concentric coils. The paperboard roll was placed into a 250 ml I-Chem bottle, and then a vial of water was placed in the interior of the coiled paperboard. Sample bottles were placed into a controlled environment maintained at 100° F. (38° C.) for 24 hours. After 25 hours at 100° F., the samples were removed from the controlled environment and held at ambient for three holding times: 1, 24 and 120 hours before analysis. At each ambient sample hold time, a bottle was transferred to a purge and trap sampler (Hewlett Packard model 19395A) interfaced via injection port to a Hewlett Packard 5890 gas chromatograph. The GC capillary column was interfaced directly to a Hewlett Packard model 5970 mass spectrometer (MS). The purge and trap sampler was modified to hold the larger format I-Chem sample bottle. Before analysis, two internal standards (1,4-difluorobenzene and chlorobenzene-d5) and two surrogate standards (bromochloromethane and naphthalene-d10) were injected through the septa into the sample bottle. The MS was operated in a mass range from 35 to 260 amu and with an ionization voltage of 70 ev. The samples were purged for 15 minutes at a flow rate of 30 ml/min. and the effluent trapped onto a Tenax column. Following the purge cycle, the Tenax trap was rapidly heated, transferring the trapped compounds to the gas chromatograph capillary column where the compounds are separated prior to entering the mass spectrometer. Sample analyte spectra were individually reviewed and compared to reference spectra.

Analyze Results: Test sample analyte identification was made by GC retention time (min) and by comparing analyte spectra to standard reference materials spectra. Quantitation of the test analytes was based upon each analyte's response factor to an internal standard. The earliest retention time analytes up to 19 minutes are quantitated against 1,4-difluorobenzene (an internal standard), and analytes from 19 minutes to 30 minutes are quantitated against chlorobenzene-d5 internal standard. Test results are provided in Table 5.

The test data show both a sensory odor intensity and analytical analyte reduction in the cartonboard coated with cellulose and acrylic coatings containing cyclodextrin, compared to cartonboard coated with cellulose and acrylic coatings without cyclodextrin.

TABLE 5

Analysis Results of Jar Headspace Volatiles from Cartonboard Samples

Sample Identification: Hold Time @ Room Temperature

| Compound | Olfactory Threshold (ppb) | Retention Time (Min.) | Control[1] 1 hour ug/g | Test[2] 1 hour ug/g | % Reduction | Control[3] 24 hours ug/g | Test[4] 24 hours ug/g | % Reduction | Control[5] 120 hours ug/g | Test[6] 120 hours ug/g | % Reduction |
|---|---|---|---|---|---|---|---|---|---|---|---|
| Acetone | — | 3.88 | 1.03 | 0.747 | 27% | 1.29 | 0.737 | 43% | 2.02 | 1.17 | 42% |
| Methyl Acetate | 6,170 | 4.78 | 0.024 | 0.010 | 58% | 0.027 | 0.013 | 52% | 0.053 | 0.027 | 49% |
| 1-Hexene | — | 6.65 | 0.006 | 0.005 | 17% | 0.011 | 0.009 | 18% | 0.013 | 0.009 | 31% |
| Butanal | 8.9 | 7.19 | 0.054 | 0.044 | 19% | 0.071 | 0.052 | 27% | 0.095 | 0.043 | 55% |
| Pentanal | 6.0 | 11.6 | 0.290 | 0.231 | 20% | 0.349 | 0.295 | 15% | 0.441 | 0.349 | 21% |
| Hexanal | 13.8 | 15.34 | 0.748 | 0.598 | 20% | 0.785 | 0.681 | 13% | 0.946 | 0.844 | 11% |
| Xylene (mixed m, p) | 324 | 17.53 | 0.015 | 0.007 | 53% | 0.01 | 0.007 | 30% | 0.013 | 0.007 | 46% |
| 2-Heptanone | 141 | 18.06 | 0.011 | 0.008 | 27% | 0.012 | 0.008 | 33% | 0.013 | 0.010 | 23% |
| Styrene | 140 | 18.20 | 0.064 | 0.027 | 58% | 0.044 | 0.034 | 23% | 0.055 | 0.033 | 40% |
| Heptanal | 4.7 | 18.58 | 0.042 | 0.029 | 31% | 0.048 | 0.034 | 29% | 0.041 | 0.036 | 12% |
| Isopropylbenzene | 23.9 | 19.32 | 0.033 | 0.016 | 52% | 0.021 | 0.016 | 24% | 0.030 | 0.015 | 50% |
| Octanal | 1.3 | 21.80 | 0.023 | 0.019 | 27% | 0.022 | 0.017 | 23% | | | | analyte concentration is in ug/g = Parts per million (ppm).
% Reduction = Based on the analyte concentration reduction in the test sample relative to control.
Olfactory Threshold (ppb) = Olfactory odor detection threshold in air ppb (volume). Standardized Human Olfactory Thresholds. M. Devos, F. Patte, J. Rouault, P. Laffort and L. J. VanGemert
[1]. Values are the average of three samples.
[2]. Values are the average of three samples.
[3]. Values are from a single sample.
[4]. Values are the average of three samples.
[5]. Values are the average of two samples.
[6]. Values are the average of two sample The sensory and analytical data set forth above show a substantial improvement in barrier or trapping properties of a product comprising the layers containing cyclodextrin. The barrier or trapping layer is made using a modified cellulose diluent. This material is a common material but can be replaced with starch or other organic or inorganic diluent without a significant difference in barrier or trapping properties. Table 4 displaying jar odor sensory results establishes a statistically significantly different result in sensory responses of a human test panel to the degree odor intensity. These data show that perceptive individuals can detect a stronger off-odor in cartonboard without a barrier trap compared to cartonboard with a barrier trap of the invention.

In Table 5, instrumental analytical data is summarized showing that this sensory result is based on a demonstrable and measurable reduction in the concentration of known odor components because of the barrier or trapping properties of the invention. Known odor components such as ketone compounds, unsaturated compounds, aldehyde compounds and aromatic compounds are all substantially reduced by the contaminant barrier or trap materials. These data show the contaminant barrier traps are highly efficient in reducing the amount of a variety of these organic compounds as they pass through the cellulosic web.

The above specification cellulosic web laminates and coated cellulosic web laminates and test data provide a basis for understanding the technical aspects of the invention. Since the invention can be made with a variety of embodiments, the invention resides in the claims hereinafter appended.

We claim:

1. A nonwoven cellulosic fiber web having improved barrier trap properties in the presence of a permeant or contaminant, the web comprising:
   (a) a structural layer comprising a continuous array of randomly oriented cellulosic fiber having a product side and an exterior side;
   (b) on the product side, a barrier layer comprising a cyclodextrin compound and a diluent; and
   (c) on the exterior side, a layer comprising a clay; wherein the cyclodextrin compound is subsequently free of an inclusion complex compound and can act as a barrier to the passage of a permeant from the ambient environment or can act as a trap of a contaminant arising from the web.

2. The web of claim 1 wherein the web comprises a layer comprising a printed legend on the exterior side subsequent to the clay layer.

3. The web of claim 1 wherein the web comprises a layer comprising a thermoplastic polymer and an effective amount of a substituted cyclodextrin compound, said compound selected form the group consisting of an acylated cyclodextrin, a trimethyl silyl substituted cyclodextrin, an hydroxyethyl substituded cyclodextrin, an hydroxypropyl substituted cyclodextrin, an acetylated cyclodextrin, a methoxy substituted cyclodextrin and mixtures thereof, on the product side of the barrier layer.

4. The web of claim 3 wherein the thermoplastic polymer comprises a polyethylene, a polypropylene, a polyester, a copolymer comprising vinyl acetate, a copolymer comprising vinyl chloride, a copolymer comprising an acrylic monomer, a polymer comprising styrene or mixtures thereof.

5. The web of claim 1 wherein the web comprises a layer comprising a thermoplastic polymer on the exterior side subsequent to the clay layer.

6. The web of claim 5 wherein the thermoplastic polymer comprises a polyethylene, a polypropylene, a polyester, a copolymer comprising vinyl acetate, a copolymer comprising vinyl chloride, a copolymer comprising an acrylic monomer, a polymer comprising styrene or mixtures thereof.

7. The web of claim 1 wherein the web comprises a coating comprising a diluent and a cyclodextrin compound on the product side subsequent to the barrier layer.

8. The web of claim 7 wherein the cyclodextrin comprises α-cyclodextrin, β-cyclodextrin, γ-cyclodextrin or mixtures thereof.

9. The web of claim 7 wherein the web comprises a coating comprising a film forming polymer and a cyclodextrin compound on the exterior side of the structural layer.

10. The web of claim 9 wherein the cyclodextrin comprises α-cyclodextrin, β-cyclodextrin, γ-cyclodextrin or mixtures thereof.

11. The web of claim 3 wherein the cyclodextrin compound comprises a cyclodextrin compound having at least one pendant moiety or substituent that renders the cyclodextrin compatible with the thermoplastic web.

12. The web of claim 11 wherein the cyclodextrin compound contains at least one acyl, trimethyl silyl, hydroxyethyl, hydroxypropyl, acetyl, methoxy or mixtures of such goups thereof on a cyclodextrin primary carbon atom.

13. The web of claim 11 wherein the cyclodextrin comprises α-cyclodextrin, β-cyclodextrin, γ-cyclodextrin and mixtures thereof.

14. The web of claim 1 wherein the barrier layer comprises about 0.1 to about 60 wt % of cyclodextrin.

15. The web of claim 1 wherein the barrier layer comprises about 0.2 to about 50 wt % of cyclodextrin.

16. The web of claim 11 wherein the cyclodextrin compound is an acylated cyclodextrin compound.

17. The web of claim 11 wherein the cyclodextrin compound is a trimethyl silyl substituted cyclodextrin compound.

18. The web of claim 11 wherein the cyclodextrin compound is a hydroxy ethyl substituted cyclodextrin compound.

19. The web of claim 11 wherein the cyclodextrin compound is a hydroxy propyl substituted cyclodextrin compound.

20. The web of claim 11 wherein the cyclodextrin compound is an acetylated cyclodextrin compound.

21. The web of claim 11 wherein the cyclodextrin compound is a methoxy substituted cyclodextrin compound.

22. The web of claim 1 wherein the barrier layer also comprises a compound that fluoresces when radiated.

23. The web of claim 22 wherein the compound fluoresces when radiated by X-ray radiation.

24. The web of claim 1 wherein the structural layer comprises paperboard.

25. The web of claim 24 wherein the paperboard gauge is 0.16 to 0.18 inches.

26. The web of claim 1 wherein the barrier layer comprises a coextruded layer comprising about 0.002 to 0.22 grams of cyclodextrin per $m^2$ of the product side of the structural layer.

27. The web of claim 7 wherein the barrier layer comprises a coating layer comprising a starch or hydroxyalkylcellulose diluent and about 0.1 to 0.6 grams of cyclodextrin per $m^2$ of the product side of the structural layer.

28. The web of claim 26 wherein the diluent comprises a polyethylene.

29. A nonwoven cellulosic fiber web having improved barrier trap properties in the presence of a permeant or contaminant, the web comprising:
   (a) a structural layer comprising a continuous array of randomly oriented cellulosic fiber having a product side and an exterior side;
   (b) on the product side, a barrier layer comprising about 0.1 to 0.6 $g/m^2$ of a cyclodextrin compound and a diluent comprising a starch compound, a hydroxyalkycellulose compound or mixtures thereof;
   (c) on the exterior side, a layer comprising a clay layer and a printed layer; wherein the cyclodextrin compound is subsequently free of an inclusion complex compound and can act as a barrier to the passage of a permeant from the ambient environment or can act as a trap of a contaminant arising from the web.

30. The web of claim 29 wherein the product side additionally comprises an acrylic coating.

31. The web of claim 29 wherein the barrier layer comprises about 0.1 to 60 wt % cyclodextrin and about 90 to 40 wt % of diluent wherein the cyclodextrin is present in the layer at an amount of 0.1 to 0.6 gram of cyclodextrin per square meter of paperboard.

32. The web of claim 29 wherein the thickness of the barrier layer is about 2 to 10 microns.

33. The web of claim 29 wherein the cyclodextrin of the barrier layer comprises a blend of an alpha cyclodextrin and a gamma cyclodextrin, wherein for each part by weight of alpha cyclodextrin there are about 100 to 0.01 parts by weight of the gamma cyclodextrin.

34. The web of claim 29 wherein the web comprises a cellulosic web having a barrier coating on the web followed by an acrylic coating.

35. The web of claim 29 wherein the web comprises a cellulosic web followed by a clay coating followed by a printed coating followed by an acrylic coating.

36. The web of claim 29 wherein the diluent is an hydroxypropyl cellulose.

37. A nonwoven cellulosic fiber web having improved barrier trap properties in the presence of a permeant or contaminant, the web comprising:
   (a) a structural layer with a thickness of 0.25 to 1 mm, comprising a continuous array of randomly oriented cellulosic fiber having a product side and an exterior side;
   (b) on the product side, a barrier layer comprising about 0.1 to 0.6 gms-1000 $ft^{-2}$ of a cyclodextrin compound in a hydroxypropyl cellulose diluent;
   (c) on the exterior side, a layer comprising a clay layer with a thickness of 20 to 80 microns and a printed layer comprising about 0.05 to 1 lbs-1000 $ft^{-2}$;
wherein the cyclodextrin compound is subsequently free of an inclusion complex compound and can act as a barrier to the passage of a permeant from the ambient environment or can act as a trap of a contaminant arising from the web.

38. A nonwoven cellulosic fiber web having improved barrier trap properties in the presence of a permeant or contaminant, the web comprising:
   (a) a structural layer with a thickness of 0.4 to 0.8 mm, comprising a continuous array of randomly oriented cellulosic fiber having a product side and an exterior side;
   (b) on the product side, a coextruded barrier layer with a thickness of 0.3 to 1.5 mil microns, comprising 0.2 to 20 $g/1000ft^2$ of a cyclodextrin compound and a polyethylene diluent;

(c) on the exterior side, a layer comprising a clay layer with a thickness of 20 to 80 microns and a printed layer comprising about 0.05 to 1 lbs-1000 ft$^{-2}$; wherein the cyclodextrin compound is subsequently free of an inclusion complex compound and can act as a barrier to the passage of a permeant from the ambient environment or can act as a trap of a contaminant arising from the web.

39. The web of claim 7 wherein the cyclodextrin compound is an acylated cyclodextrin compound.

40. The web of claim 7 wherein the cyclodextrin compound is a trimethyl silyl substituted cyclodextrin compound.

41. The web of claim 7 wherein the cyclodextrin compound is a hydroxy ethyl substituted cyclodextrin compound.

42. The web of claim 7 wherein the cyclodextrin compound is a hydroxy propyl substituted cyclodextrin compound.

43. The web of claim 7 wherein the cyclodextrin compound is an acetylated cyclodextrin compound.

44. The web of claim 7 wherein the cyclodextrin compound is a methoxy substituted cyclodextrin compound.

* * * * *

UNITED STATES PATENT AND TRADEMARK OFFICE
CERTIFICATE OF CORRECTION

PATENT NO. : 5,985,772
DATED : NOVEMBER 16, 1999
INVENTOR(S) : WOOD ET AL.

It is certified that error appears in the above-identified patent and that said Letters Patent is hereby corrected as shown below:

Col 8, lines 47-48: delete "0.15 inches to 0.30 inches)" after "0.8 mm;"

Col. 8, lines 48-49: delete "(0.16 inches to 0.28 inches)" after the word "point"

Col. 19, line 38: "72EF." should read --72° F.--

Col. 30, line 42: "subsequently" should read --substantially--

Col. 30, line 53: "form" should read "from"

Col. 31, line 57: "0.16 to 0.18 inches." should read --0.25 to 1 mm.--

Col. 31, line 67: "polyethylene." should read --starch, an hydroxyalkycellulose or mixtures thereof.--

Col. 32, line 65: delete "microns" after "1.5 mil"

Signed and Sealed this

Tenth Day of April, 2001

*Attest:*

NICHOLAS P. GODICI

*Attesting Officer*      *Acting Director of the United States Patent and Trademark Office*